(12) United States Patent
Kang et al.

(10) Patent No.: US 10,740,626 B2
(45) Date of Patent: Aug. 11, 2020

(54) METHOD AND APPARATUS FOR IDENTIFYING DRIVING LANE

(71) Applicant: SAMSUNG ELECTRONICS CO., LTD., Suwon-si (KR)

(72) Inventors: Nahyup Kang, Seoul (KR); KeeChang Lee, Seongnam-si (KR); Inwoo Ha, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 248 days.

(21) Appl. No.: 15/891,877

(22) Filed: Feb. 8, 2018

(65) Prior Publication Data

US 2019/0095722 A1    Mar. 28, 2019

(30) Foreign Application Priority Data

Sep. 28, 2017  (KR) .................. 10-2017-0126241

(51) Int. Cl.
| | |
|---|---|
| *G06K 9/00* | (2006.01) |
| *G06T 7/215* | (2017.01) |
| *G06T 7/11* | (2017.01) |
| *G08G 1/16* | (2006.01) |

(52) U.S. Cl.
CPC ............ *G06K 9/00798* (2013.01); *G06T 7/11* (2017.01); *G06T 7/215* (2017.01); *G08G 1/167* (2013.01)

(58) Field of Classification Search
CPC ....... G06K 9/00798; G06T 7/215; G06T 7/11; G08G 1/167
See application file for complete search history.

(56) References Cited

U.S. PATENT DOCUMENTS

| | | | |
|---|---|---|---|
| 7,860,652 B2 | 12/2010 | Nishida et al. | |
| 8,055,445 B2 | 11/2011 | Schiffmann et al. | |
| 9,056,630 B2 | 6/2015 | Han et al. | |
| 9,352,746 B2 | 5/2016 | Fritsch et al. | |
| 9,373,043 B2 | 6/2016 | Lu et al. | |
| 9,470,788 B2 | 10/2016 | Oh et al. | |
| 9,672,734 B1* | 6/2017 | Ratnasingam | H04L 67/12 |

(Continued)

FOREIGN PATENT DOCUMENTS

| | | |
|---|---|---|
| JP | 2017-41228 A | 2/2017 |
| KR | 10-0917330 B1 | 9/2009 |

(Continued)

OTHER PUBLICATIONS

Gonzalez, Juan Pablo, and Umit Ozguner. "Lane detection using histogram-based segmentation and decision trees." ITSC2000. 2000 IEEE Intelligent Transportation Systems. Proceedings (Cat. No. 00TH8493). IEEE, 2000.*

(Continued)

*Primary Examiner* — Shefali D Goradia
(74) *Attorney, Agent, or Firm* — NSIP Law

(57) ABSTRACT

A method and apparatus for identifying a driving lane extracts a road marking from an input image, generate a multi-virtual lane using the road marking and a segmentation image obtained by segmenting the input image into objects included in the input image based on a semantic unit, and identifies a driving lane of a vehicle based on a relative location of the driving lane in the multi-virtual lane.

40 Claims, 21 Drawing Sheets

(56) References Cited

U.S. PATENT DOCUMENTS

| | | | | |
|---|---|---|---|---|
| 2009/0012709 A1* | 1/2009 | Miyazaki | ............... | G01C 21/26 701/514 |
| 2010/0014714 A1* | 1/2010 | Zhang | ................ | G06K 9/00798 382/104 |
| 2010/0098297 A1* | 4/2010 | Zhang | ................... | B60W 30/09 382/104 |
| 2010/0241605 A1* | 9/2010 | Groitzsch | .............. | G01C 21/26 706/47 |
| 2015/0375784 A1 | 12/2015 | Ogawa | | |

FOREIGN PATENT DOCUMENTS

| | | |
|---|---|---|
| KR | 10-2015-0124889 A | 11/2015 |
| KR | 10-2015-0146374 A | 12/2015 |
| KR | 10-1583797 B1 | 1/2016 |
| KR | 10-1637535 B1 | 7/2016 |
| KR | 10-2016-0143595 A | 12/2016 |
| KR | 10-2017-0007596 A | 1/2017 |

OTHER PUBLICATIONS

Nieto, Marcos, et al., "Robust Multiple Lane Road Modeling Based on Perspective Analysis", *15th IEEE International Conference on Image Processing*, 2008, (pp. 2396-2399).

Partial European Search Report dated Oct. 29, 2018 in corresponding European Patent Application No. 18167581.0 (12 pages in English).

Huang, Y. et al., "Do Motion Boundaries Improve Semantic Segmentation?" Workshop on brave new ideas for motion representations in videos, in conjunction with ECCV, Amsterdam, NL, Oct. 2016 (4 pages in English).

Brust et al., Convolutional Patch Networks with Spatial Prior for Road Detection and Urban Scene Understanding, Computer Vision and Pattern Recognition, Feb. 23, 2015 (9 pages in English).

Sun, S. et al., "Real-Time Road Space Detection using Convolutional Neural Network," The Korean Society of Automotive Engineers (KSAE), Nov. 2016 (3 pages).

Khan, Jesmin F. et al., "Image Segmentation and Shape Analysis for Road-Sign Detection", *IEEE Transactions on Intelligent Transportation Systems,* vol. 12, No. 1, Mar. 2011 (pp. 83-96).

Azad, Reza et al., "Optimized Method for Iranian Road Signs Detection and Recognition System", International Journal of Research in Computer Science, vol. 4, Issue 1, 2014 (pp. 19-26).

Extended European Search Report dated Apr. 9, 2019 in counterpart European Patent Application No. 18167581.0 (16 pages in English).

\* cited by examiner

METHOD AND APPARATUS FOR IDENTIFYING DRIVING LANE

CROSS-REFERENCE TO RELATED APPLICATIONS

This application claims the benefit under 35 USC § 119(a) of Korean Patent Application No. 10-2017-0126241 filed on Sep. 28, 2017, in the Korean Intellectual Property Office, the entire disclosure of which is incorporated herein by reference for all purposes.

BACKGROUND

1. Field

The following description relates to a method and apparatus for identifying a driving lane.

2. Description of Related Art

A variety of visual information augmentation methods are used to assist vehicles and other transportation devices in traveling or driving. A method of extracting road information from an input image may be used to augment visual information. A lane departure warning system (LDWS) and an adaptive cruise control (ACC) may also be used to assist vehicles and other transportation devices in traveling or driving. A LDWS determines whether a vehicle deviates from a lane along which the vehicle is traveling, and an ACC automatically controls a speed of a vehicle while allowing the vehicle to keep a distance from another vehicle in front. However, the LDWS may process only an input image with a narrow viewing angle, and may not be readily applied to determine information for an entire road and localize a vehicle. Also, the ACC may control a speed of a vehicle only based on another vehicle traveling ahead of the vehicle on a same lane, and thus, may not recognize or process an entire structure of a road on which the vehicle is traveling.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of identifying a driving lane, including obtaining an input image, extracting a road marking from the input image, segmenting the input image into objects included in the input image based on a semantic unit to obtain a segmentation image, generating a multi-virtual lane using the road marking and the segmentation image, and identifying a driving lane of a vehicle based on a relative location of the driving lane in the multi-virtual lane.

The input image may include an image in front of the vehicle, and the image may include a road on which the vehicle may be traveling or a road boundary portion of at least a left side or a right side of the road.

The road marking may include any one or any combination of a line marked on a surface of a road, or a road sign including one or any combination of a sign and a character marked on the surface of the road.

The extracting of the road marking may include extracting pixels corresponding to the road marking from the input image, and classifying the pixels into groups and removing a group corresponding to the road sign.

The removing of the group corresponding to the road sign may include classifying the pixels into groups using a connected component operation, determining whether each of the groups of the pixels corresponds to the line or the road sign, and removing the group corresponding to the road sign.

The generating of the multi-virtual lane may include extracting a left lane boundary line and a right lane boundary line of the driving lane using a group corresponding to the line, generating virtual lines by fitting the left lane boundary line and the right lane boundary line in the segmentation image, and generating the multi-virtual lane by positioning the virtual lines in parallel on a left side and a right side of the left lane boundary line and the right lane boundary line, respectively, at equidistant intervals in the segmentation image.

The generating of the multi-virtual lane may include generating the multi-virtual lane based on expanding a left lane boundary line and a right lane boundary line of the driving lane on a left side and a right side, respectively, at equidistant intervals in the segmentation image.

The generating of the multi-virtual lane may include generating the multi-virtual lane by expanding a left lane boundary line and a right lane boundary line of the driving lane to a left side and a right side, respectively, at equidistant intervals in the segmentation image.

The identifying of the driving lane may include determining a number of lanes of the multi-virtual lane based on whether the multi-virtual lane corresponds to a road component in the segmentation image, and identifying the driving lane by determining a relative location of the driving lane on a road on which the vehicle may be traveling based on the determined number of the lanes of the multi-virtual lane.

The identifying of the driving lane may include determining the relative location of the driving lane by counting a number of lanes on the road starting from a road boundary of the road and determining which of the lanes the driving lane corresponds to, based on the number of lanes of the multi-virtual lane.

The method may include obtaining a number of lanes on a road on which the vehicle may be traveling.

The identifying of the driving lane may include identifying the driving lane of the vehicle based on the relative location of the driving lane in the multi-virtual lane that may include determined based on the number of the lanes on the road and a number of lanes of the multi-virtual lane.

The number of the lanes on the road may include obtained from map information.

The method may include transforming the input image into a top-view image.

The transforming of the input image into the top-view image may include transforming the input image and the segmentation image into a top-view input image and a top-view segmentation image, respectively, and removing a perspective component from the top-view input image and the top-view segmentation image.

The method may include performing the obtaining, the extracting, the segmenting, the generating, and the identifying, in response to recognizing a change in a driving environment.

The change in the driving environment may include any one or any combination of a change of the driving lane by the vehicle, a departure of the vehicle from the driving lane, an entry of a nearby vehicle into the driving lane, and a change of the road marking.

In another general aspect, there is provided a method of identifying a driving lane, including extracting, from an input image, a left lane boundary line and a right lane boundary line of a driving lane of a vehicle, generating a segmentation image by segmenting the input image into objects included in the input image based on a semantic unit, generating a multi-virtual lane by fitting, in the segmentation image, the left lane boundary line and the right lane boundary line on a left side and a right side at equidistance intervals, determining a number of lanes of the multi-virtual lane based on whether the multi-virtual lane corresponds to a road component in the segmentation image, and identifying the driving lane by determining a relative location of the driving lane on a road on which the vehicle may be traveling based on the determined number of the lanes of the multi-virtual lane.

The identifying of the driving lane may include determining the relative location of the driving lane by counting a number of lanes on the road starting from a road boundary of the road and determining which of the lanes the driving lane corresponds to, based on the number of the lanes of the multi-virtual lane.

The extracting of the left lane boundary line and the right lane boundary line of the driving lane may include transforming the input image into a top-view image, and extracting, from the top-view image, the left lane boundary line and the right lane boundary line of the driving lane.

The transforming of the input image into the top-view image may include transforming the input image and the segmentation image into a top-view input image and a top-view segmentation image, respectively, and removing a perspective component from the top-view input image and the top-view segmentation image.

The method may include obtaining, from map information, a number of lanes on the road, wherein the identifying of the driving lane may include determining the relative location of the driving lane by counting the number of the lanes on the road starting from a road boundary of the road and determining the driving lane based on the number of the lanes on the road and the number of the lanes of the multi-virtual lane.

The method may include performing the extracting, the generating of the segmentation image, the generating of the multi-virtual lane, the determining, and the identifying, in response to recognizing a change in a driving environment.

In another general aspect, there is provided an apparatus for identifying a driving lane, including an image sensor configured to capture an input image, and a processor configured to extract a road marking from the input image, to obtain a segmentation image by segmenting the input image into objects included in the input image based on a semantic unit, to generate a multi-virtual lane using the road marking and the segmentation image, and to identify a driving lane of a vehicle based on a relative location in the multi-virtual lane.

The apparatus may include a memory configured to store any one or any combination of the input image, the segmentation image, a relative location of the multi-virtual lane, map information, and navigation information.

The processor may be configured to extract pixels corresponding to the road marking from the input image, classify the pixels into groups using a connected component operation, determine whether each of the groups of the pixels corresponds to a line or a road sign, and remove the group corresponding to the road sign.

The processor may be configured to determine a number of lanes of the multi-virtual lane based on whether the multi-virtual lane corresponds to a road component in the segmentation image, and identify the driving lane by determining a relative location of the driving lane on a road on which the vehicle may be traveling based on the number of the lanes of the multi-virtual lane.

The processor may be configured to transform the input image and the segmentation image into respective a top-view input image and a top-view segmentation image, respectively, and remove a perspective component from the top-view input image and the top-view segmentation image.

The apparatus may include a communication interface configured to receive any one or any combination of map information, navigation information corresponding to a road on which the vehicle may be traveling and including a number of lanes on the road, wherein the processor may be configured to identify the driving lane of the vehicle based on the relative location in the multi-virtual lane that may include determined based on the number of the lanes on the road.

The processor may be configured to recognize a change in a driving environment, and identify the driving lane, in response to the recognizing of the change in the driving environment.

In another general aspect, there is provided a navigation apparatus including a sensor configured to capture an image in front of a vehicle, and a processor configured to generate a segmentation image by segmenting the image into portions corresponding to objects included in the input image, identify a left lane boundary line and a right lane boundary line from the image, generate virtual lines based on fitting the left lane boundary line and the right lane boundary line in the segmentation image, generate a multi-virtual lane based on arranging the virtual lines in parallel on at equidistant intervals in the segmentation image, and determine a number of lanes of the multi-virtual lane based on whether the multi-virtual lane corresponds to a road object in the segmentation image, and identify a driving lane of the vehicle based on a relative location of the driving lane among the determined number of the lanes of the multi-virtual lane.

The processor may be configured to extract pixels corresponding to a road marking from the image, classify the extracted pixels into groups, determine whether a classified group of the groups correspond to a line, and identify the left lane boundary line or the right lane boundary line, in response to the classified group corresponding to a line.

The processor may be configured to transforming the input image and the segmentation image into a top-view input image and a top-view segmentation image, respectively, and extract information from the top-view input image and the top-view segmentation image to identify the left lane boundary line and the right lane boundary line.

The processor may be configured to remove a portion of the segmentation image, the portion corresponding to opposite side lane object based on identifying a centerline of a road on which the vehicle may be traveling.

The processor may be configured to set a region of interest (ROI) on a left-side and a right-side of the vehicle in the top-view input image, and extract the left lane boundary line and the right lane boundary line from the ROI using objects corresponding to a line of a road marking.

The processor may be configured to output the identified driving lane of the vehicle on a display.

In another general aspect, there is provided a vehicle including a sensor configured to capture an image, a driving lane identifying processor configured to extract a road marking from the image, to obtain a segmentation image by segmenting the image into objects based on a semantic unit, to generate a multi-virtual lane using the road marking and the segmentation image, and to identify a driving lane based on a relative location of the vehicle in the multi-virtual lane.

Other features and aspects will be apparent from the following detailed description, the drawings, and the claims.

Figure 1:
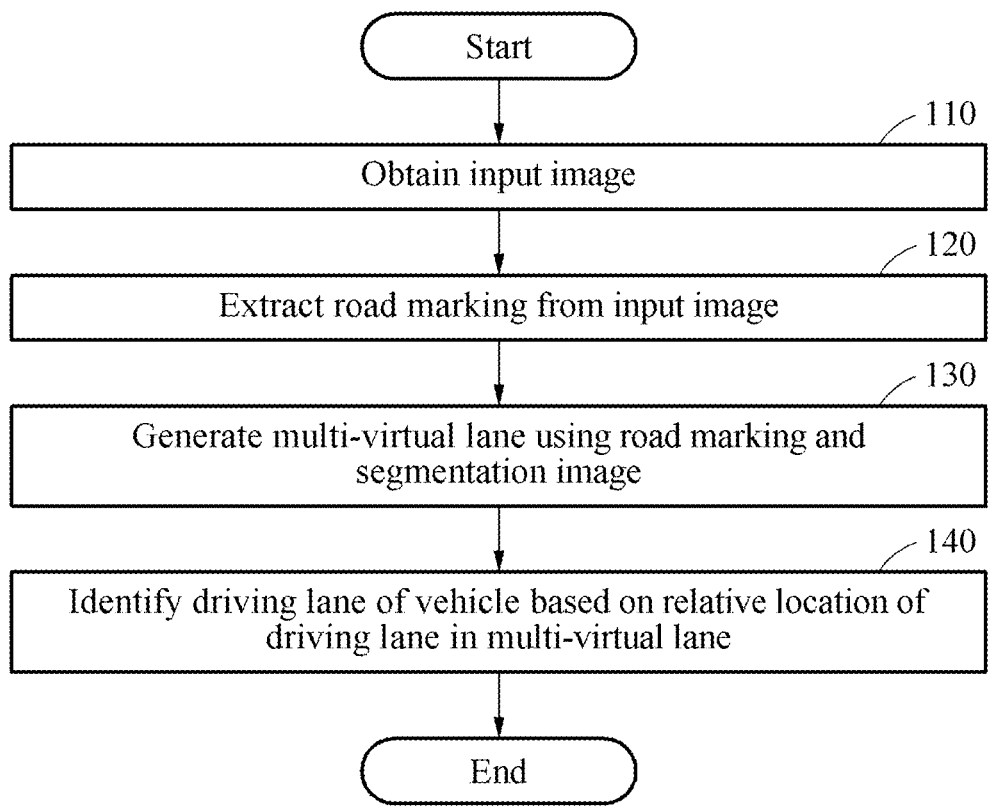
FIG. 1 is a diagram illustrating an example of a method of identifying a driving lane.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise.

Detailed description of well-known related structures or functions will be omitted when it is deemed that such description will cause ambiguous interpretation of the present disclosure.

The apparatus and methods described herein may be used to indicate a line in an augmented reality navigation system of a smart vehicle, or generate visual information to assist an autonomous or automated driving vehicle in steering. The examples may also be used to interpret visual information in a device including an intelligent system, such as a head-up display (HUD) or a vehicular infotainment system, installed for in-vehicle driving assistance or fully autonomous or automated driving, and thus enable safer and more comfortable driving. The examples may be applicable to different types of vehicles. The vehicle described herein refers to any mode of transportation, delivery, or communication such as, for example, an automobile, a truck, a tractor, a scooter, a motorcycle, a cycle, an amphibious vehicle, a snowmobile, a boat, a public transit vehicle, a bus, a monorail, a train, a tram, an autonomous or automated driving vehicle, an intelligent vehicle, a self-driving vehicle, an unmanned aerial vehicle, a drone, or a mobile device.

In another example, the lane detection apparatus disclosed herein is included in another device placed in the vehicle. In an example, the lane detection apparatus is embodied or incorporated in various types of products such as, for example, an intelligent agent, a mobile phone, a cellular phone, a smart phone, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a server, a personal computer (PC), a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device, portable navigation device (PND), a handheld game console, an e-book, a high definition television (HDTV), a smart appliance, communication systems, image processing systems, graphics processing systems, various Internet of Things (IoT) devices that are controlled through a network, a smart vehicle, an intelligent automobile, an autonomous driving vehicle, other consumer electronics/information technology (CE/IT) device, or any other device capable of wireless communication or network communication consistent with that disclosed herein.

In another example the lane detection apparatus is external to the vehicle, and is disposed in a device, such as, for example, a computer, a server, and a mobile phone, and communicates with the vehicle through wireless communication or network communication consistent with the disclosed herein.

FIG. 1 is a diagram illustrating an example of a method of identifying a driving lane. Hereinafter, the method of identifying a driving lane may be referred to as a driving lane identifying method. The operations in FIG. 1 may be performed in the sequence and manner as shown, although the order of some operations may be changed or some of the operations omitted without departing from the spirit and scope of the illustrative examples described. Many of the operations shown in FIG. 1 may be performed in parallel or concurrently. One or more blocks of FIG. 1, and combinations of the blocks, can be implemented by special purpose hardware-based computer that perform the specified functions, or combinations of special purpose hardware and computer instructions.

In operation 110, an apparatus for identifying a driving lane, hereinafter referred to as a driving lane identifying apparatus, obtains an input image. In an example, the input image, such as the input image 1100 of FIG. 11, includes features such as, a road image and a road surface image including a vehicle, a lane, a line, a curbstone, a sidewalk, and surrounding environment. In an example, the driving lane identifying apparatus obtains a single input image or a plurality of input images for each frame using an image capturing device provided in a front of a vehicle. It is assumed that calibration information of the capturing device is known in advance. The capturing device may include devices, such as, for example, a mono camera, a vision sensor, and an image sensor. Other capturing devices, such as, for example light detection and ranging (LiDAR) may be used without departing from the spirit and scope of the illustrative examples described. The input image may be an image captured by the capturing device included in the driving lane identifying apparatus or by other devices.

In an example, the input image includes an entire road, a road boundary portion of a left side or a right side of the road. For example, when all lanes on the road are not captured due to, for example, a viewing angle of the capturing device and an occlusion by a nearby vehicle or obstacle, the driving lane identifying apparatus may determine a number of lanes on the road using map information or location information of the vehicle. In another example, the driving lane identifying apparatus may receive the number of the lanes through a voice input or a touch input by a user.

A road used herein refers to a road on which vehicles travel and includes various types of roads, for example, an expressway, a national highway, a local road, a national expressway, a by-lane, a toll road, frontage road, side road, a driveway, a Limited access grade-separated highway, and a limited-access road. Other types of roads, such as, for example, multimodal roads, back roads, and dirt road may be used without departing from the spirit and scope of the illustrative examples described. The road may include a single lane or a plurality of lanes.

A lane used herein refers to a space on a road that is distinguished by lines marked on a surface of the road. A driving lane used herein refers to a lane along which a vehicle is traveling among a plurality of lanes on a road, and is also construed as being a lane space occupied and used by the vehicle. A single lane is distinguished by lines on a left side and a right side of the lane.

A line used herein is construed as being various types of lines, such as, for example, a solid line, a broken line indicated in white, blue, or yellow, or any other demarcation on a surface of a road. Various types of lines on a road may include, for example, a zigzag line, a bus-only lane demarcating line, and a sidewalk demarcating line, in addition to a line that demarcates a lane. Among these various types of lines, a line that demarcates a lane is herein referred to as a lane boundary line.

In A traveling vehicle or a vehicle used herein refers to any mode of transportation, delivery, or communication such as, for example, for example, a vehicle traveling on a road, an autonomous or automated driving vehicle, and an intelligent or smart vehicle equipped with an advanced driver assistance system (ADAS), and the other types of vehicles mentioned above.

Figure 17A:
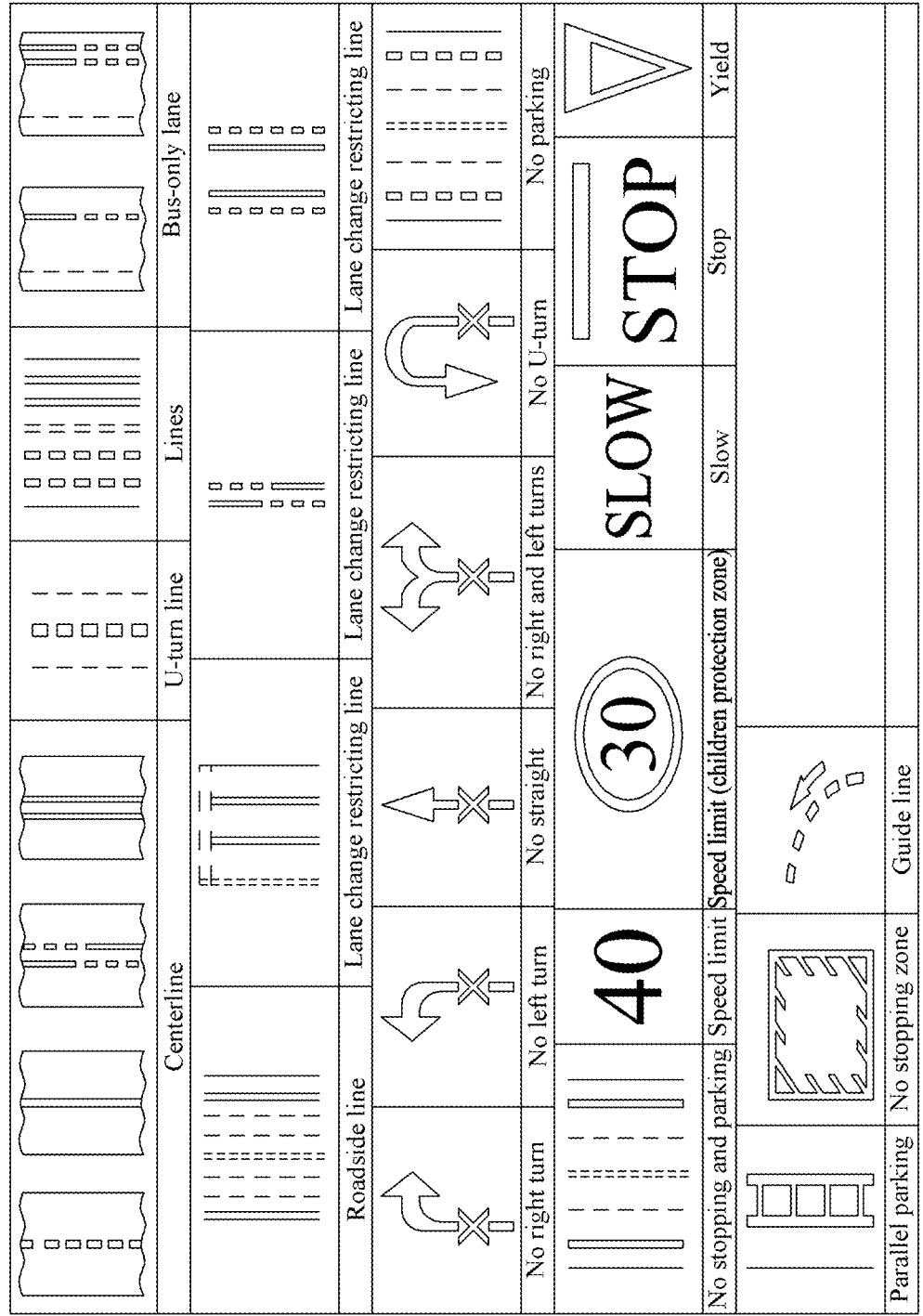
FIGS. 17A and 17B are diagrams illustrating examples of road markings.
Figure 17B:
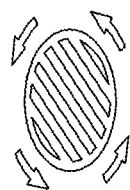

In operation 120, the driving lane identifying apparatus extracts a road marking from the input image. The road marking refers to a marking indicated on a surface of a road on which a vehicle travels. The road marking may include lines including, for example, a no-passing line, a double line, a passing line, a centerline including a broken line by which a vehicle is allowed to change a driving lane and a solid line by which a vehicle is not allowed to change a driving lane, a zigzag line for slow driving, a bus-only lane demarcating line, and a sidewalk demarcating line, and include road signs indicating directions, mileposts, boundary signs, and any of the lines described above. In an example, the road marking include with signs or symbols, such as, for example, an uphill slope sign, a crosswalk ahead sign, a slow sign, a speed limit sign, a turning lane sign, and a no stop sign, and/or with characters, for example, children protection zone and slow down. The lines may also include a line that demarcates a lane, for example, a lane boundary line. Such various examples of the road marking are illustrated in FIGS. 17A and 17B.

In an example, the driving lane identifying apparatus extracts the road marking including a line and/or a road sign from the input image using, for example, a convolutional neural network (CNN), a deep neural network (DNN), and a support vector machine (SVM) that are trained in advance to recognize the road marking. The CNN may be trained in advance with various road markings included in road images, and may be a region-based CNN. The CNN may be trained such that, for example, a line to be detected in the input image is determined along with a bounding box of a road sign, and a line to be detected in the input image is determined along with a type of a road sign.

In an example, using the CNN trained with lines and/or road signs of various road images, the driving lane identifying apparatus may extract a line robustly against various situations. The driving lane identifying apparatus may extract the road marking using various machine learning methods in addition to the examples described above. A method of extracting a road marking by the driving lane identifying apparatus will be described in greater detail with reference to FIG. 2.

Figure 12:
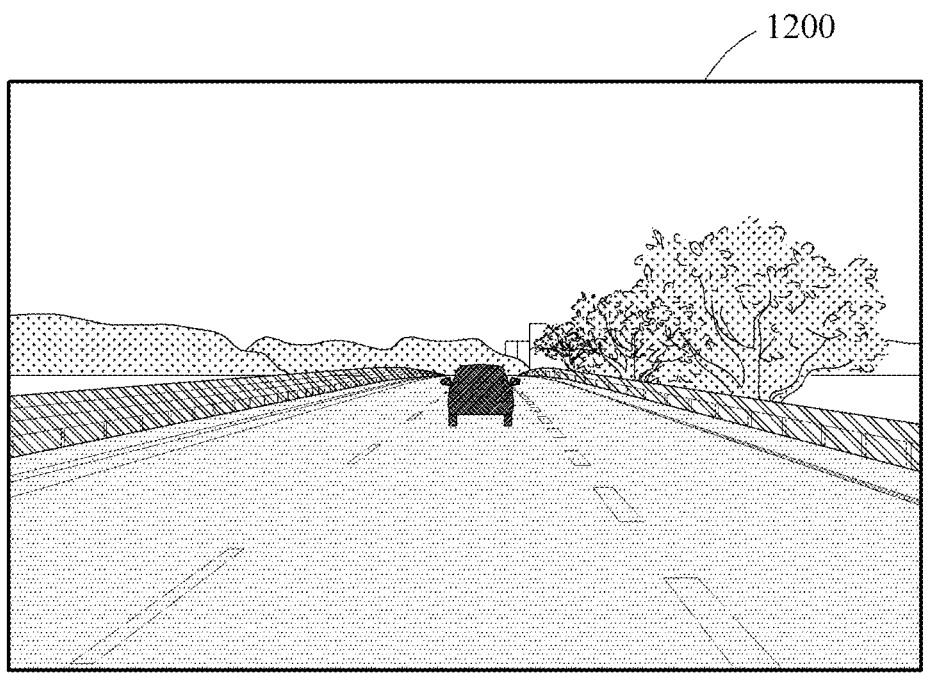
FIG. 12 is a diagram illustrating an example of a segmentation image.

In operation 130, the driving lane identifying apparatus generates a multi-virtual lane using the road marking and a segmentation image obtained by segmenting the input image into objects included in the input image based on a semantic unit. In an example, the driving lane identifying apparatus generates the segmentation image by segmenting the input image into the objects included in the input image by a semantic unit, determining a semantics of each of segmented regions by a pixel unit, and performing labeling for each class. In an example, a class may be classified into about 20 classes based on a semantic unit, for example, a road, a vehicle, a sidewalk, a human being, an animal, sky, and a building. The class may be classified in other number and types of classes without departing from the spirit and scope of the illustrative examples described. The driving lane identifying apparatus may precisely identify where and how an element or a component of an image, for example, an object and a background, is present from a pixel-unit label included in the segmentation image. In addition, the driving lane identifying apparatus may classify elements or components included in the segmentation image using the pre-trained CNN, DNN, and SVM. An example of the segmentation image is illustrated in FIG. 12.

In an example, the driving lane identifying apparatus generates the multi-virtual lane by expanding a left lane boundary line and a right lane boundary line of the driving lane on a left side and a right side at equidistant intervals in the segmentation image. For example, the driving lane identifying apparatus may generate the multi-virtual lane by fitting, in the segmentation image, the left lane boundary line and the right lane boundary line of the driving lane that are extracted in operation 120 and arranging the fitted left lane boundary line and the fitted right lane boundary line in parallel on the left side and the right side at equidistant intervals. A method of generating a multi-virtual lane by the driving lane identifying apparatus will be described in greater detail with reference FIG. 3.

In operation 140, the driving lane identifying apparatus identifies the driving lane of the vehicle using a relative location in the multi-virtual lane. The driving lane identifying apparatus may count a number of lanes on the road starting from one in a road boundary of the road and determining which lane does the driving lane corresponds to. For example, the driving lane identifying apparatus may identify that the vehicle travels on a lane that is second from a right side of the multi-virtual lane including four lanes, or a third lane. The driving lane identifying method performed by the driving lane identifying apparatus will be described in greater detail with reference to FIG. 4.

Figure 2:
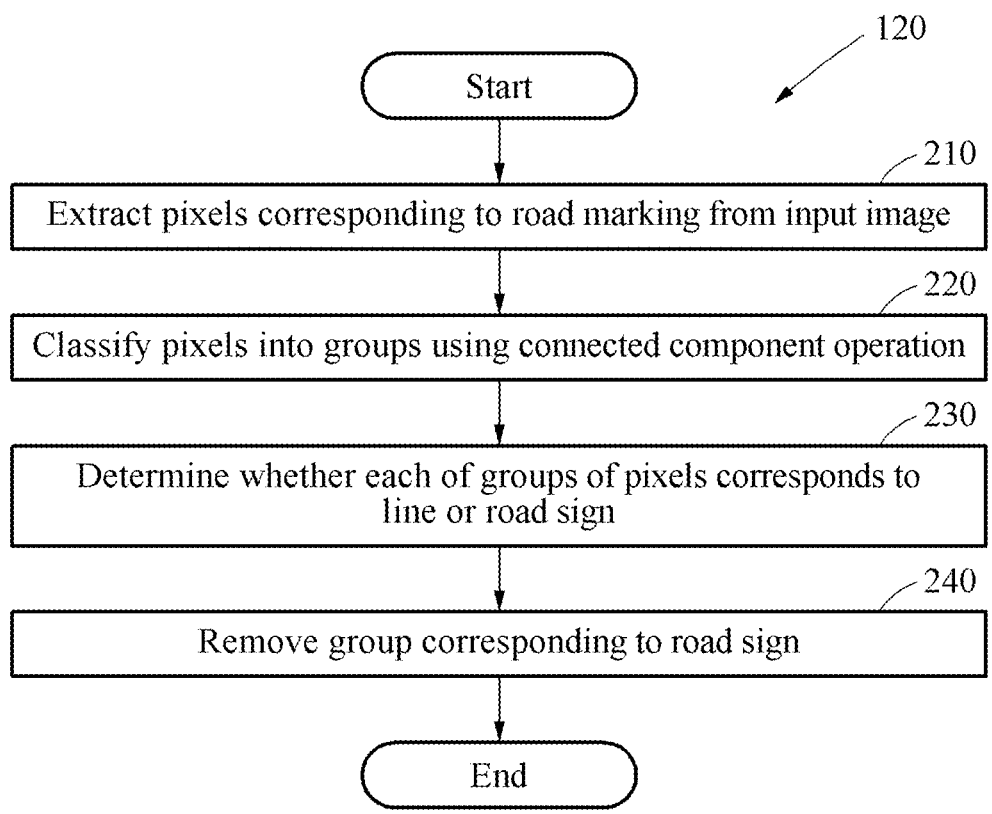
FIG. 2 is a diagram illustrating an example of a method of extracting a road marking from an input image.

FIG. 2 is a diagram illustrating an example of a method of extracting a road marking from an input image. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer that perform the specified functions, or combinations of special purpose hardware and computer instructions. In addition to the description of FIG. 2 below, the descriptions of FIG. 1 are also applicable to FIG. 2, and are incorporated herein by reference. Thus, the above description may not be repeated here.

In operation 210, the driving lane identifying apparatus extracts pixels corresponding to a road marking from an input image. The driving lane identifying apparatus classifies the extracted pixels into groups, and removes a group corresponding to a road sign of the road marking.

In operation 220, the driving lane identifying apparatus classifies the pixels using a connected component operation. The connected component operation refers to an operation used in a graph theory to connect subgraphs including peaks connected through at least one path in a graph. The driving lane identifying apparatus classifies pixels into a same group through the connected component operation, and extracts the pixels corresponding to the road marking.

In operation 230, the driving lane identifying apparatus determines whether each of the groups of the pixels corresponds to a line (e.g., a boundary line of a lane, in more detail) or a road sign. The driving lane identifying apparatus may determine whether a group of pixels corresponds to a line or a road sign using, for example, a SVM and a neural network. In an example, in which a group of pixels indicates a straight line, the driving lane identifying apparatus may determine that the group corresponds to a line. In an example, where a group of pixels indicates a character, a sign or symbol, or an arrow, the driving lane identifying apparatus may determine that the group corresponds to a road sign.

In operation 240, the driving lane identifying apparatus removes a group corresponding to a road sign. The driving lane identifying apparatus may then generate the multi-virtual lane using a line, for example, a boundary line of a lane, which is left after the group of pixels corresponding to a road sign is removed.

Figure 3:
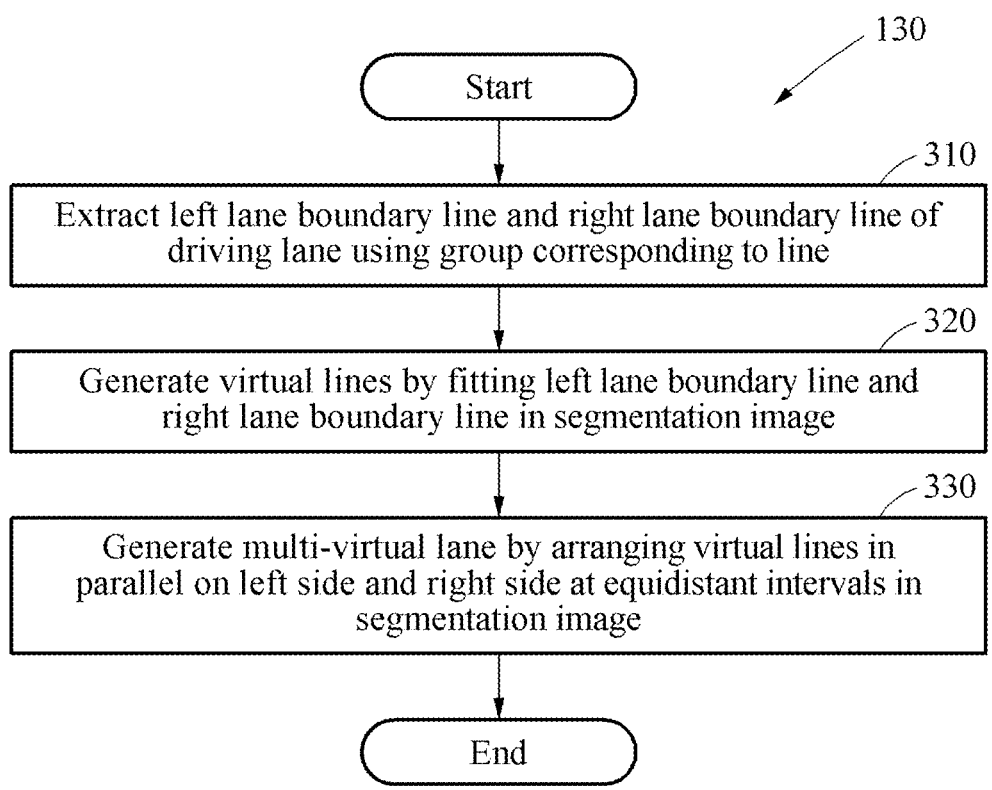
FIG. 3 is a diagram illustrating an example of a method of generating a multi-virtual lane.

FIG. 3 is a diagram illustrating an example of a method of generating a multi-virtual lane. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer that perform the specified functions, or combinations of special purpose hardware and computer instructions. In addition to the description of FIG. 3 below, the descriptions of FIGS. 1-2 are also applicable to FIG. 3, and are incorporated herein by reference. Thus, the above description may not be repeated here.

Figure 14:
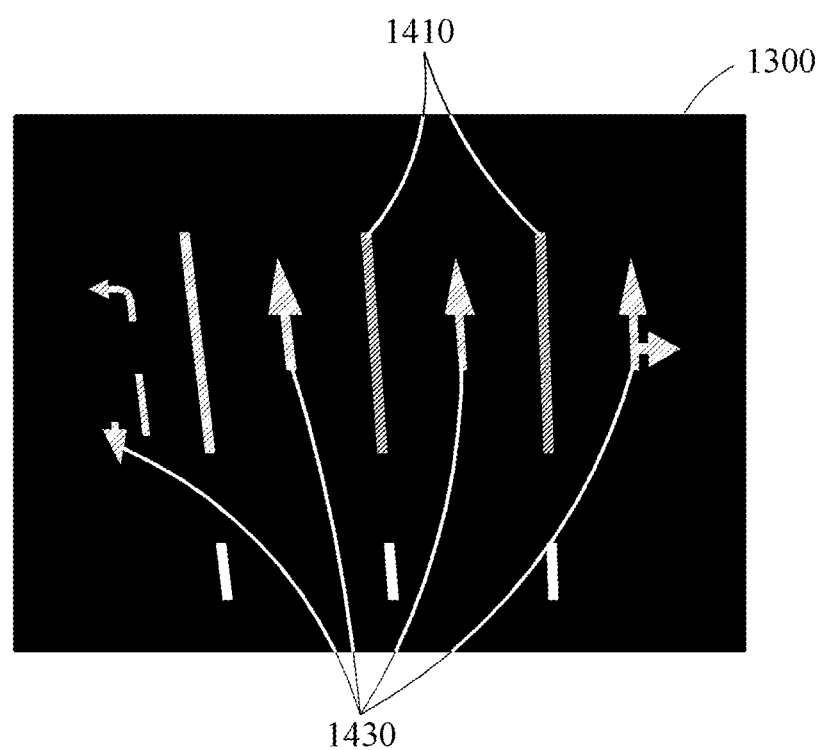
FIG. 14 is a diagram illustrating an example of a road marking extracted from an input image.

In operation 310, the driving lane identifying apparatus extracts a left lane boundary line and right lane boundary line of a lane, for example, boundary lines 1410 of FIG. 14, using a group corresponding to a line.

Figure 15:
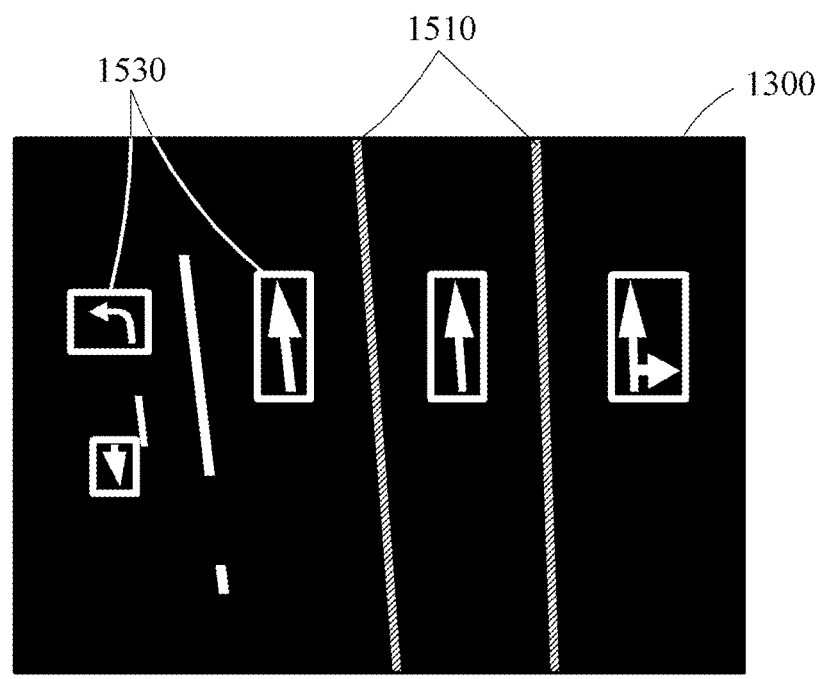
FIG. 15 is a diagram illustrating an example of a method of generating virtual lines.

In operation 320, the driving lane identifying apparatus generates virtual lines, for example, virtual lines 1510 of FIG. 15, by fitting, in a segmentation image, the boundary lines that demarcate a left boundary and a right boundary of the lane. The driving lane identifying apparatus may generate the virtual lines, for example, the virtual lines 1510, by fitting the boundary lines in the segmentation image using a spline or a polyline based on a local gradient or a local threshold.

Figure 16A:
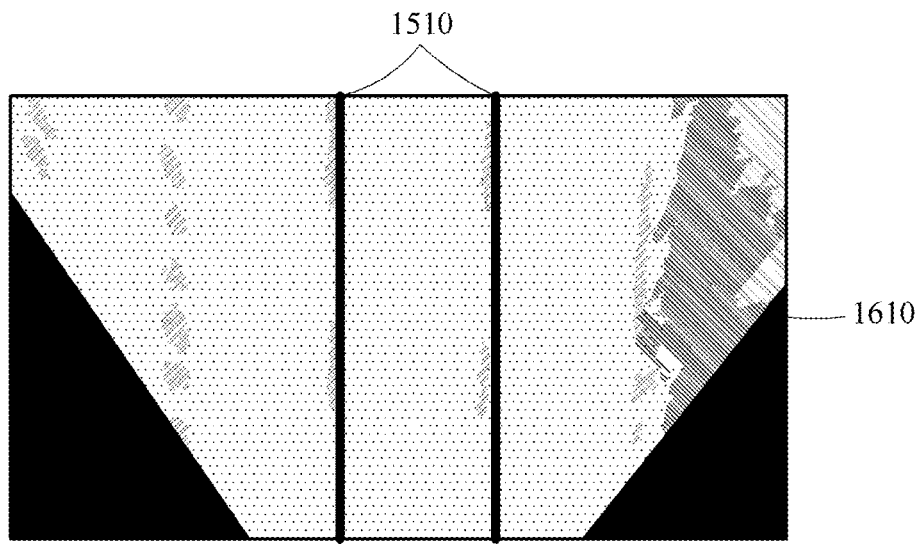
FIGS. 16A and 16B are diagrams illustrating an example of a method of generating a multi-virtual lane.
Figure 16B:
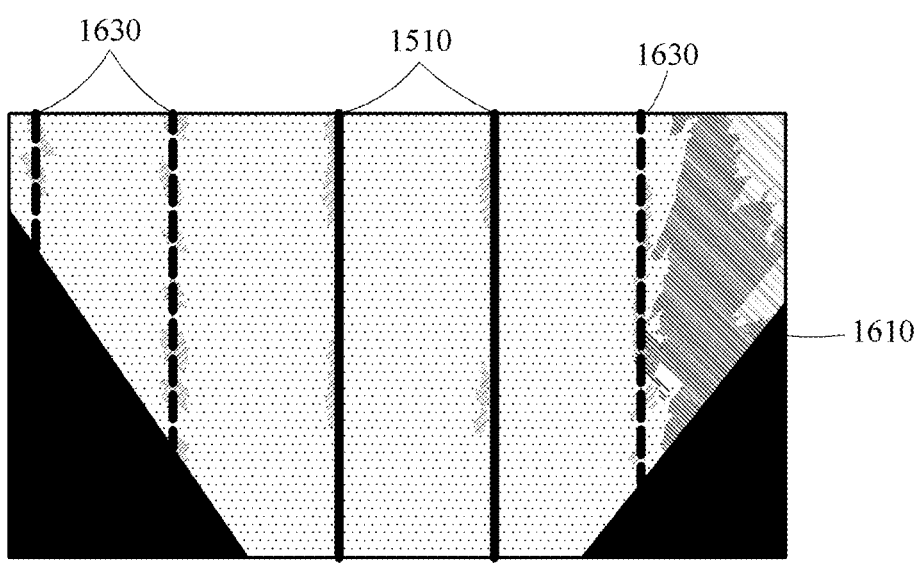

In operation 330, the driving lane identifying apparatus generates a multi-virtual lane that is distinguished by virtual lines, for example, virtual lines 1630 of FIG. 16B, that are generated by arranging the virtual lines in parallel on a left side and a right side at equidistant intervals in the segmentation image.

Figure 4:
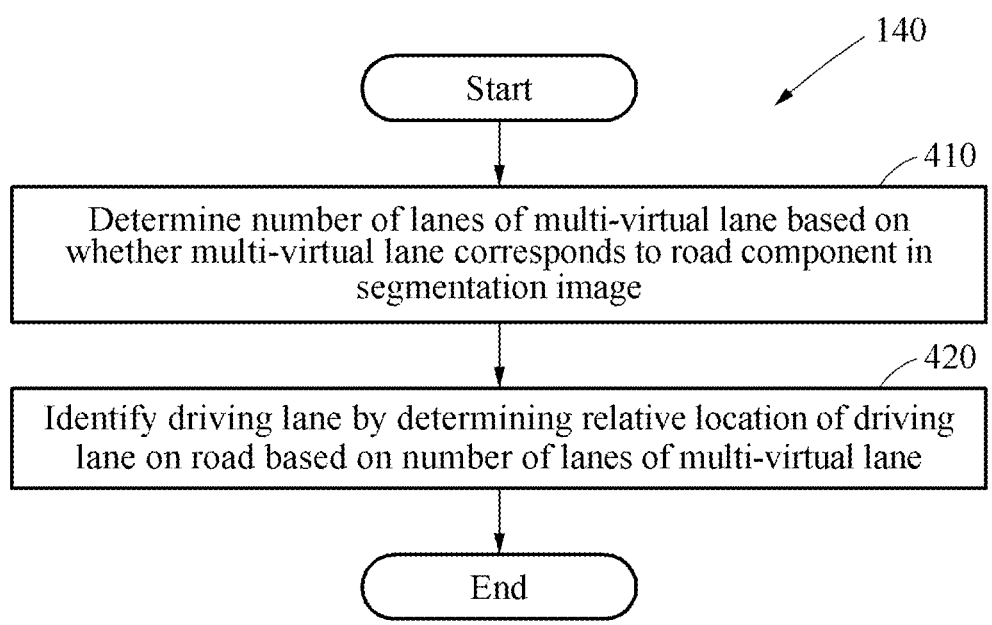
FIG. 4 is a diagram illustrating an example of a method of identifying a driving lane along which a vehicle is traveling.

FIG. 4 is a diagram illustrating an example of a method of identifying a driving lane along which a vehicle is traveling. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

In operation 410, the driving lane identifying apparatus determines a number of lanes of a multi-virtual lane based on whether the multi-virtual lane corresponds to a road component in a segmentation image. In an example, the driving lane identifying apparatus matches the multi-virtual lane to the segmentation image. The driving lane identifying apparatus may determine whether a road is present in a corresponding region of the segmentation image based on a result of the matching, or whether the multi-virtual lane corresponds to the road component, or a road class, in the segmentation image. When it is determined that the multi-virtual lane corresponds to the road component in the segmentation image, the driving lane identifying apparatus may count a number of lanes corresponding to the road component and determine the number of the lanes of the multi-virtual lane.

In operation 420, the driving lane identifying apparatus identifies a driving lane by determining a relative location of the driving lane on the road based on the number of the lanes of the multi-virtual lane that is determined in operation 410. The driving lane identifying apparatus may determine the relative location of the driving lane of a vehicle on the road by counting the number of the lanes of the multi-virtual lane starting from one in a left or right boundary of the multi-virtual lane, and determining which of the lanes the driving lane corresponds to. In an example, the driving lane identifying apparatus may determine the relative location of the driving lane or the vehicle, by counting a number of lanes on the road and determining which of the lanes the driving lane corresponds to starting from a right road boundary or a left road boundary based on a national traffic regulation of each country, for example, traffic keeps to the left in Japan and Britain and traffic keeps to the right in Korea and America.

Figure 5:
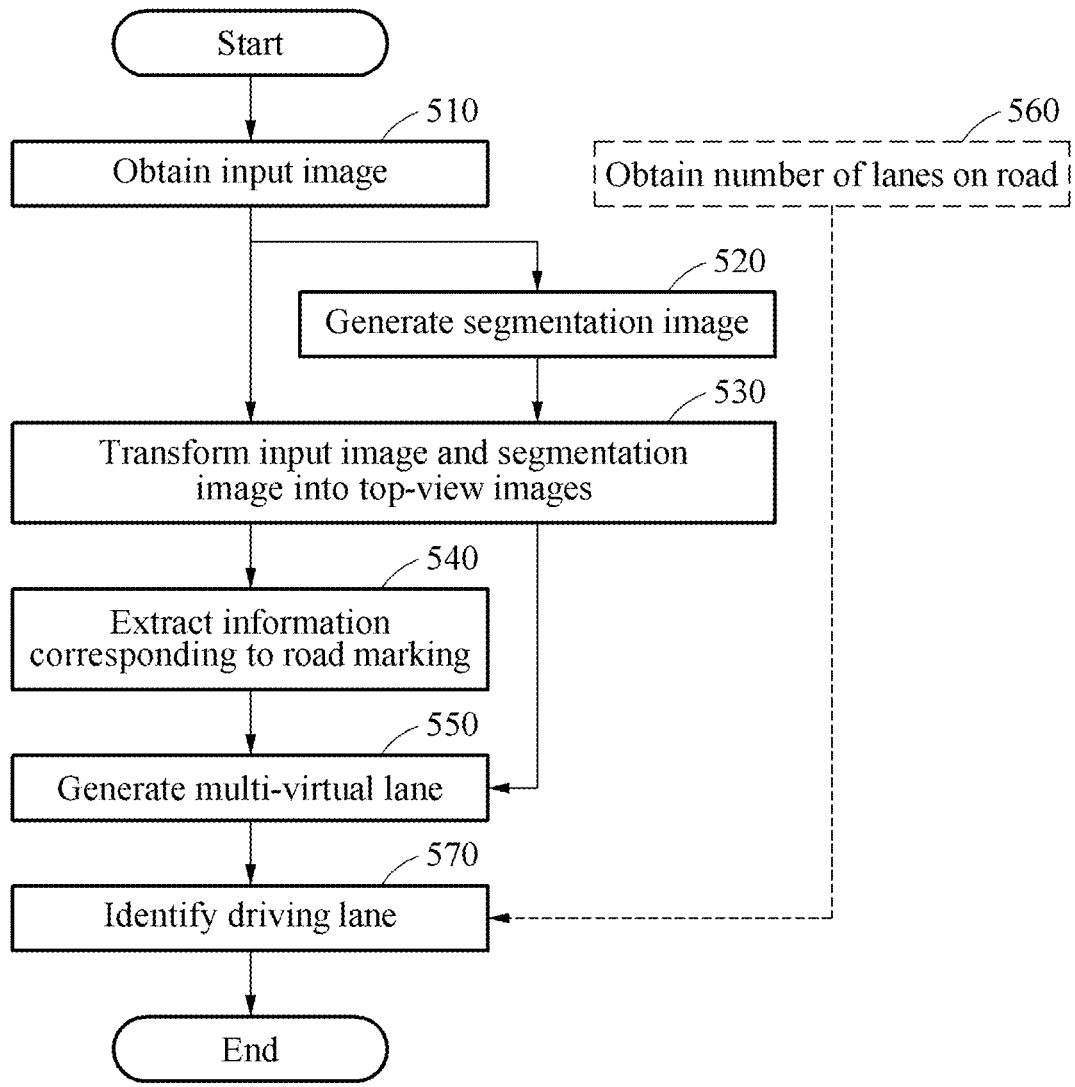
FIG. 5 is a diagram illustrating an example of a method of identifying a driving lane.

FIG. 5 is a diagram illustrating another example of a driving lane identifying method. FIG. 5 illustrates an example of a driving lane identifying method to be performed by transforming an input image to a top-view image. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer that perform the specified functions, or combinations of special purpose hardware and computer instructions. In addition to the description of FIG. 5 below, the descriptions of FIGS. 1-4 are also applicable to FIG. 5, and are incorporated herein by reference. Thus, the above description may not be repeated here.

Referring to FIG. 5, in operation 510, the driving lane identifying apparatus obtains an input image. In operation 520, the driving lane identifying apparatus generates a segmentation image by segmenting the input image into portions corresponding to objects included in the input image, for example, a road, a line, and a vehicle, by a semantic unit using a semantic segmentation method, and by detecting the portions by a pixel unit.

In an example, an image segmentation method includes segmenting the input image into regions or structures as an output by using, for example, an edge or a color included in the input image as a reference for the segmenting. That is, such a segmentation method may segment an image based on an attribute, but the segmentation method may not determine the attribute. In contrast, the semantic segmentation method refers to a method of densely predicting objects by a pixel unit, and outputting a pixel-unit region including an object class after determining which object is included in an image.

In an example, the driving lane identifying apparatus may generate the segmentation image through a classification network including a convolution layer in several stages and a fully connected layer. While passing through the classification network, the input image may be reduced by $\frac{1}{32}$ in size from an original size. For such a pixel-unit dense prediction, the original size may need to be restored.

The driving lane identifying apparatus may segment the input image into a plurality of regions using a classifier model that is trained to output a training output from a training image. The classifier model may be, for example, a CNN. For example, the training image may be a color image, and the training output may indicate a region image obtained by segmenting a training input. For example, the training output may be a region image that is segmented in advance based on an attribute or a class that is manually designated, for example, a vehicle, a human being, an object, and a background, corresponding to each pixel of the training image.

The driving lane identifying apparatus may generate the segmentation image by segmenting the input image into the objects included in the input image by a semantic unit using a classification network such as, for example, AlexNet, VGGNet, and GoogleNET, to determine a semantics of each segmented region by each pixel unit, and labeling each segmented region for each class.

In operation 530, the driving lane identifying apparatus transforms the input image and the segmentation image into respective top-view images. The driving lane identifying apparatus may remove a perspective component from the top-view input image obtained through the transforming and the top-view segmentation image obtained through the transforming.

In operation 540, the driving lane identifying apparatus extracts information corresponding to a road marking of a road from the top-view input image, for example, a left lane boundary line and a right lane boundary line of a driving lane. In operation 550, the driving lane identifying apparatus generates a multi-virtual lane using the information corresponding to the road marking and the top-view segmentation image. The driving lane identifying apparatus generates virtual lines by fitting the left lane boundary line and the right lane boundary line in the top-view segmentation image, and generates the multi-virtual lane by arranging the virtual lines in parallel on a left side and a right side at equidistant intervals in the top-view segmentation image.

In operation 560, the driving lane identifying apparatus obtains a number of lanes on the road. The driving lane identifying apparatus may obtain the number of the lanes on the road from, for example, global positioning system (GPS) information, map information, and navigation information. In an example, the GPS information, the map information, and the navigation information is directly detected by the driving lane identifying apparatus through a GPS sensor. In another example, the GPS information, the map information, and the navigation information is received from a map database, or provided by a sensor, a database, or other electronic devices disposed outside the driving lane identifying apparatus.

As described above, the input image is obtained by capturing an image of an entire road, or capturing a road boundary portion on at least one of a left side or a right side of the road. When an image of only one road boundary portion is captured due to a limited viewing angle of a capturing device or an occlusion by other vehicles, the driving lane identifying apparatus may only identify the driving lane corresponding to starting from the road boundary portion. The driving lane identifying apparatus may not be able to accurately identify the number of lanes on the road, or which lane the driving lane corresponds to among the lanes on the road. The driving lane identifying apparatus may more accurately determine a relative location of the driving lane by comparing the number of the lanes on the road on which the vehicle is traveling and a number of lanes of the multi-virtual lane in operation 570 of identify the driving lane, using the number of the lanes on the road that is obtained in operation 560.

In operation 570, the driving lane identifying apparatus identifies the driving lane using the multi-virtual lane generated in operation 550 and the number of the lanes on the road obtained in operation 560. In an example, the driving lane identifying apparatus determines the number of the lanes of the multi-virtual lane based on whether the multi-virtual lane corresponds to a road component in the segmentation image. In an example, the driving lane identifying apparatus identifies the driving lane by determining a relative location of the driving lane on the road based on the number of the lanes on the road and the number of the lanes of the multi-virtual lane. A driving lane identifying method to be performed by the driving lane identifying apparatus will be described in greater detail with reference to FIG. 6.

Figure 6:
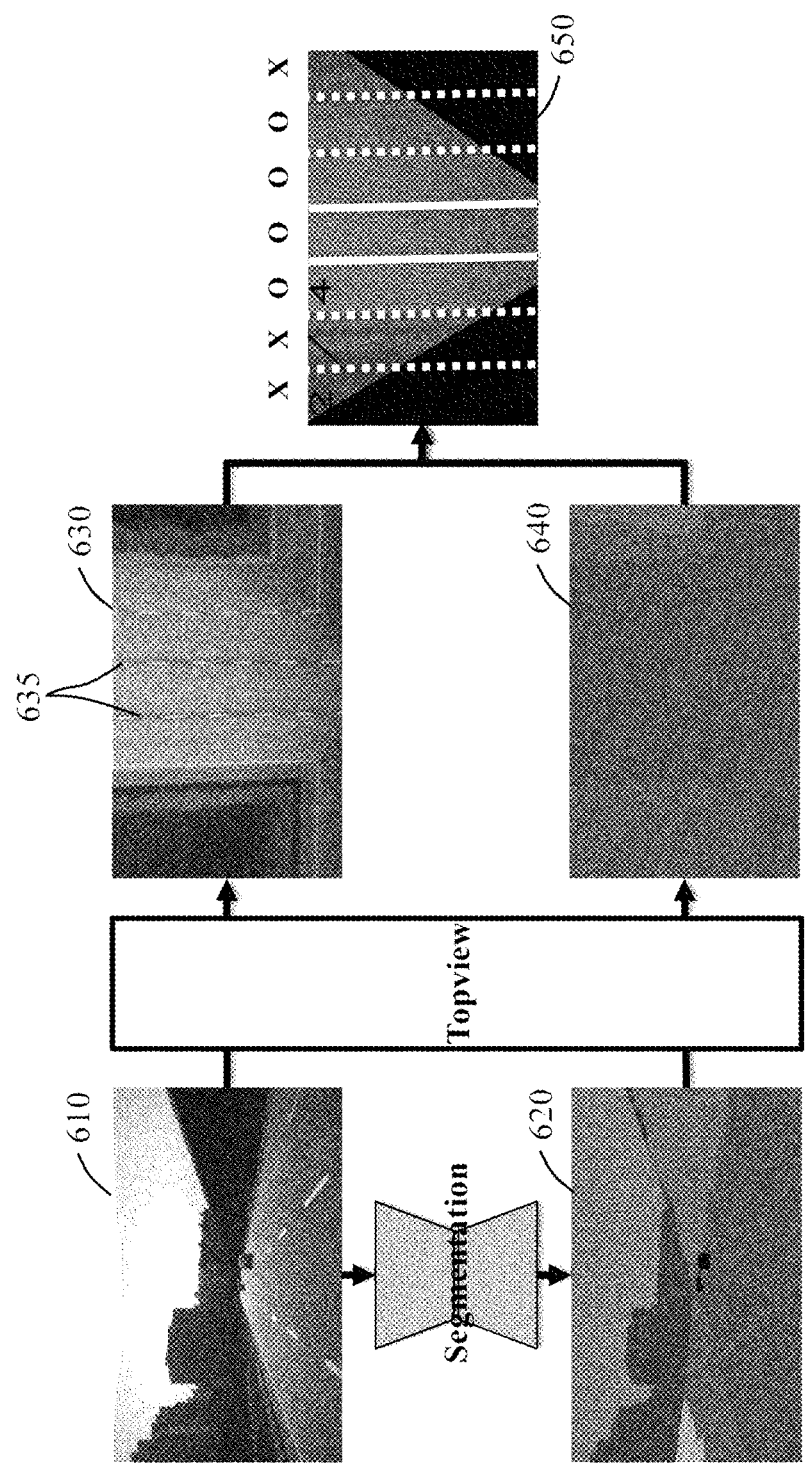
FIG. 6 is a diagram illustrating an example of a method of identifying a driving lane.

FIG. 6 is a diagram illustrating an example of a driving lane identifying method.

FIG. 6 illustrates an input image 610, a segmentation image 620 corresponding to the input image 610, a top-view input image 630 obtained by transforming the input image 610 into a top-view image, a top-view segmentation image 640 obtained by transforming the segmentation image 620 into a top-view image, and a multi-virtual lane image 650. In the multi-virtual lane image 650, solid lines indicate virtual lines corresponding to lane boundary lines of a driving lane, and broken lines indicate virtual lanes generated by expanding the virtual lines corresponding to the lane boundary lines of the driving lane at equidistant intervals on a right side and a left side of the driving lane.

Referring to FIG. 6, the driving lane identifying apparatus extracts, from the top-view input image 630, left and right lane boundary lines 635 of a driving lane using a group of pixels corresponding to a line, and generates virtual lines indicated by solid lines corresponding to the left and right lane boundary lines 635 in the multi-virtual lane image 650 by fitting the left and right lane boundary lines 635 in the top-view segmentation image 640. The driving lane identifying apparatus generates virtual lines indicated by broken lines by arranging the virtual lines indicated by the solid lines to be in parallel on a left side and a right side of the solid lines and spaced at equidistant intervals.

The driving lane identifying apparatus generates a multi-virtual lane demarcated by the virtual lines indicated by the solid lines and the broken lines. The driving lane identifying apparatus determines a number of lanes of the multi-virtual lane based on whether the multi-virtual lane corresponds to a road component in the top-view segmentation image 640. In the multi-virtual lane image 650, a lane indicated by "0" on the top indicates a lane that corresponds to the road component in the top-view segmentation image 640, and a lane indicated by "X" on the top indicates a lane that does not correspond to the road component in the top-view segmentation image 640.

The driving lane identifying apparatus determines the number of the lanes of the multi-virtual lane to be four by counting a number of lanes indicated by "0", and identifies the driving lane by determining a relative location of the driving lane in the multi-virtual lane. For example as illustrated in FIG. 6, one lane is present on a left side of the driving lane and two lanes are present on a right side of the driving lane, thus the multi-virtual lane include four lanes. The driving lane identifying apparatus may determine the relative location of the driving lane to be a second lane by counting what number the driving lane corresponds to in the multi-virtual lane including four lanes, starting from a left boundary of the multi-virtual lane.

According to an example, the driving lane identifying apparatus identifies a driving lane of a vehicle based on a centerline. A driving lane identifying method to be performed by the driving lane identifying apparatus based on a centerline will be described in detail with reference to FIG. 7.

According to an example, when an input image includes only a road boundary portion of one side of a road, the driving lane identifying apparatus may identify a driving lane of a vehicle using a number of lanes on the road obtained outside the driving lane identifying apparatus. A driving lane identifying method to be performed by the driving lane identifying apparatus using a number of lanes on a road will be described in detail with reference to FIG. 8.

Figure 7:
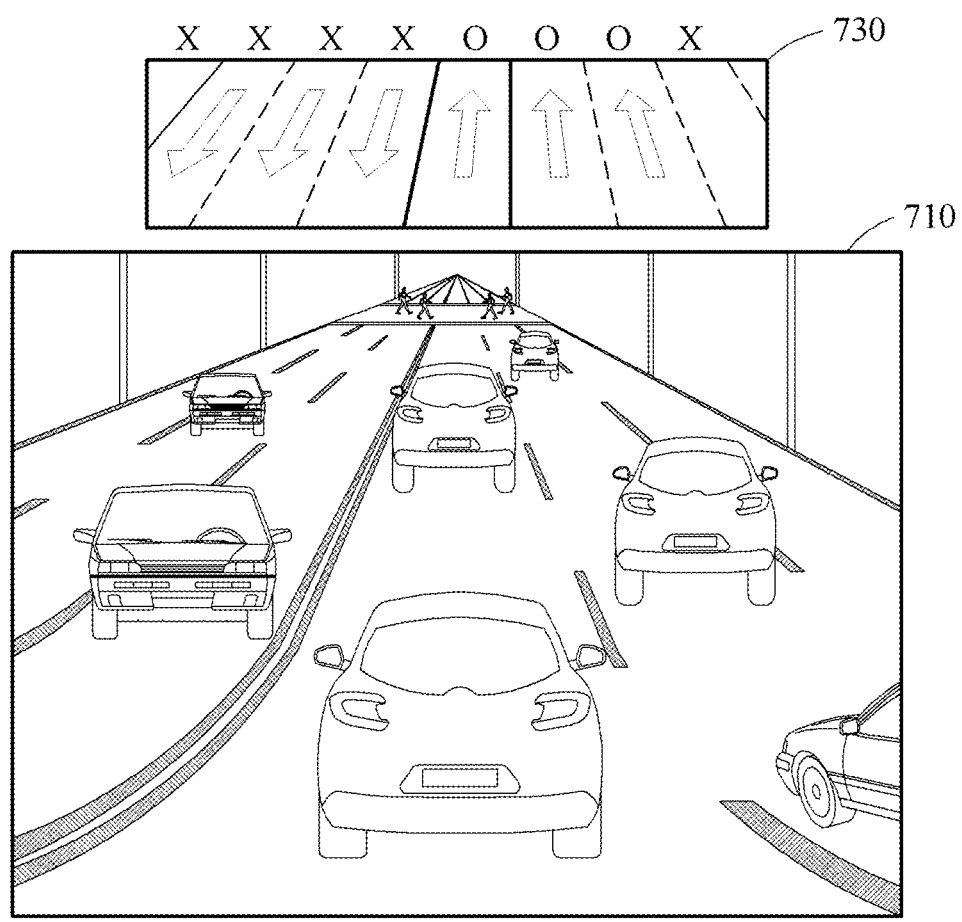
FIG. 7 is a diagram illustrating an example of a method of identifying a driving lane by recognizing a centerline.

FIG. 7 is a diagram illustrating an example of a driving lane identifying method to be performed by recognizing a centerline. FIG. 7 illustrates an input image 710 of a two-way six-lane road, and a multi-virtual lane 730 generated in response to the input image 710. An arrow indicated in each lane of the multi-virtual lane 730 indicates a traveling direction of a vehicle included in the input image 710, and is not actually included in the multi-virtual lane 730.

The driving lane identifying apparatus extracts, from the input image 710, a left lane boundary line and a right lane boundary line of a driving lane only using a group of pixels corresponding to a line, and generates the multi-virtual lane 730 by fitting the left lane boundary line and the right lane boundary line in a segmentation image. When the driving lane identifying apparatus does not distinguish a centerline indicated by a dual solid line, the two-way six-lane road in the input image 710 is classified into a road component in the segmentation image, irrespective of a traveling direction. For example, when the two-way six-lane road is classified into the same road component, the driving lane identifying apparatus may generate a multi-virtual lane in which a lane on an opposite side of a driving lane is indicated as an available driving space irrespective of a traveling direction. In such a case, the generated multi-virtual lane may have six lanes, although a number of lanes that are actually available for driving or traveling is three.

In an example, the driving lane identifying apparatus may classify a lane located on another side of a centerline indicated by a dual solid line into an opposite side lane class having a traveling direction opposite to a direction of a driving lane, based on a direction in which a camera captures the input image 710. In an example, the driving lane identifying apparatus identifies or removes a region that is classified into the opposite side lane class based on the centerline when generating the segmentation image, such that the region corresponding to the opposite side lane class is not included in a road component when generating a multi-virtual lane. Such an opposite side lane region that does not correspond to a road component in the multi-virtual lane 730 may be indicated by x and not included in the number of lanes of the multi-virtual lane 730 to be counted.

Figure 8A:
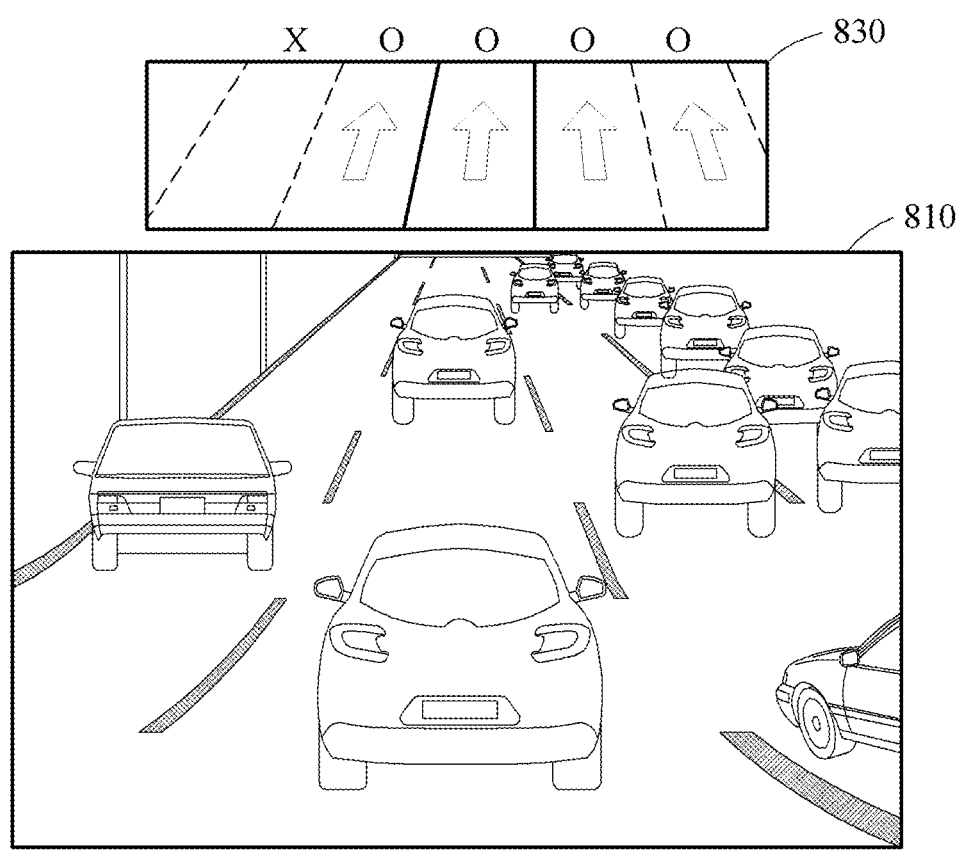
FIGS. 8A and 8B are diagrams illustrating an example of a method of identifying a driving lane based on a number of lanes on a road.
Figure 8B:
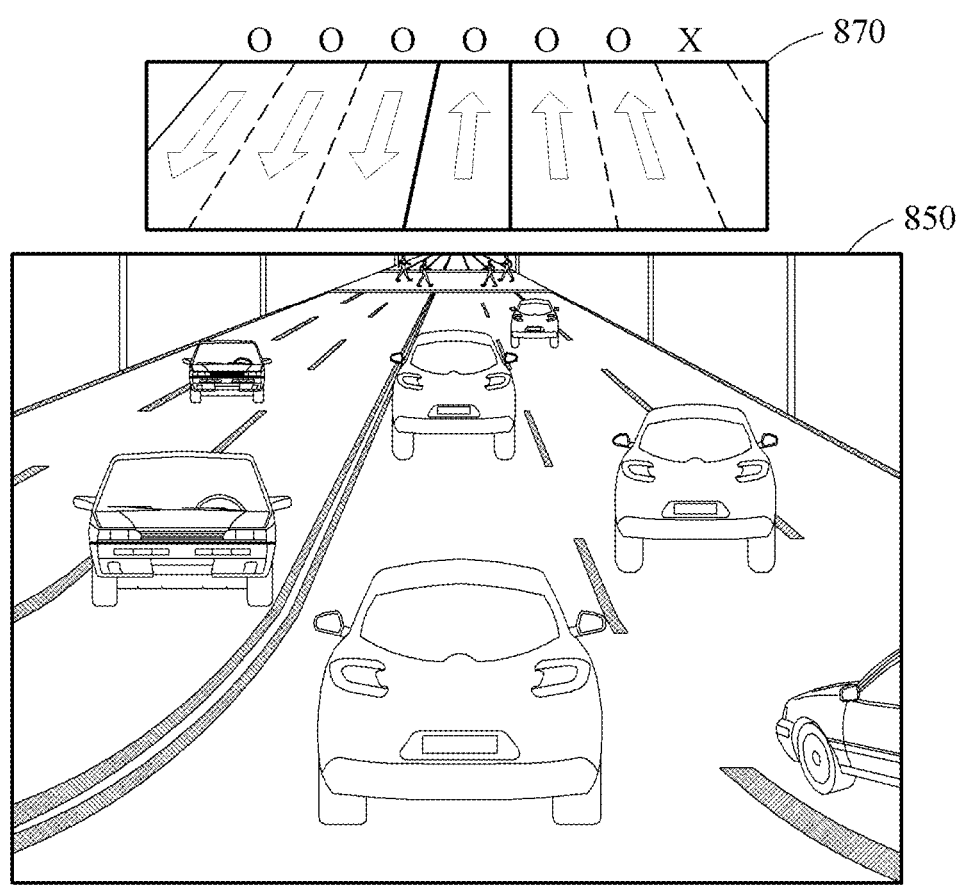

FIGS. 8A and 8B are diagrams illustrating examples of a driving lane identifying method based on a number of lanes on a road. FIG. 8A illustrates an input image 810 in which a right road boundary portion of a road is occluded by other vehicles, and a multi-virtual lane 830 is generated in response to the input image 810. In such an example where a road boundary portion on one side of a road is not identified, as illustrated in the input image 810, the driving lane identifying apparatus may identify a driving lane of a vehicle also using a number of lanes on the road that is obtained through map information or navigation information.

A driving lane identifying method based on a number of lanes on a road may be performed as follows.

In an example, as illustrated in FIG. 8A, a vehicle travels on a five-lane road including five lanes and only four lanes from a left road boundary portion of the five-lane road are captured due to a viewing angle of a capturing device or due to other vehicles traveling nearby. The driving lane identifying apparatus generates the multi-virtual lane 830 including the four lanes through the operations described above. The driving lane identifying apparatus determines that the multi-virtual lane 830 indicates a portion of the lanes on the road by comparing the five lanes on the road and the four lanes of the multi-virtual lane 830. The driving lane identifying apparatus identifies the driving lane of the vehicle by determining the portion of the lanes on the road the multi-virtual lane 830 indicates, for example, a four lane portion from the left road boundary portion of the road. Here, the driving lane identifying apparatus identifies a relative location of the driving lane as a second lane on the five-lane road because the vehicle is on a second lane of the multi-virtual lane 830 indicating the four lanes from the left road boundary portion of the five-lane road.

In an example, the driving lane identifying apparatus obtains a number of lanes on a road from map information or navigation information based on whether road boundary portions on both sides of the road are recognized from an input image, and uses the obtained number to identify a driving lane of a vehicle.

FIG. 8B illustrates an input image 850, and a multi-virtual lane 870 generated in response to the input image 850.

For example, when lanes on a road in the input image 850 are not clearly distinguished whether the lanes are one-way six lanes or two-way six lanes because an additional median strip is not present or the driving lane identifying apparatus does not distinguish a centerline from the input image 850, the driving lane identifying apparatus may classify all the six lanes included in the input image 850 into a same road component in a segmentation image irrespective of a traveling direction. When all the six lanes of the two-way six-lane road are classified into the same road component, the driving lane identifying apparatus may generate a multi-virtual lane 870 including six lanes including an opposite side lane region on an opposite side of a driving lane. In such a case, the driving lane identifying apparatus may not accurately identify the driving lane because the multi-virtual lane 870 includes the six lanes although a number of lanes that are actually available for traveling are only three lanes in one way.

In an example, the driving lane identifying apparatus obtains a number of lanes on a road on which a vehicle is traveling, for example, a two-way six-lane road or a one-way three-lane road, from map information or navigation information. The driving lane identifying apparatus compares the obtained number of the lanes on the road and a number of lanes of the multi-virtual lane 870, for example, six lanes. Based on the comparison, the driving lane identifying apparatus determines that there is an error in the multi-virtual lane 870. For example, the driving lane identifying apparatus determines that the multi-virtual lane 870 includes all the two-way six lanes irrespective of a traveling direction, because the actual number of the lanes on the road, for example, one-way three lanes, is less than the six lanes of the multi-virtual lane 870.

In such an example, the driving lane identifying apparatus may determine a number of lanes of the multi-virtual lane 870 by dividing the number of the multi-virtual lane by 2. The driving lane identifying apparatus may divide the multi-virtual lane 870 into two, and determine a portion including virtual lines indicated by solid lines in the divided multi-virtual lane to be the driving lane. The driving lane identifying apparatus may identify the driving lane of the vehicle based on the finally determined multi-virtual lane 870.

Figure 9:
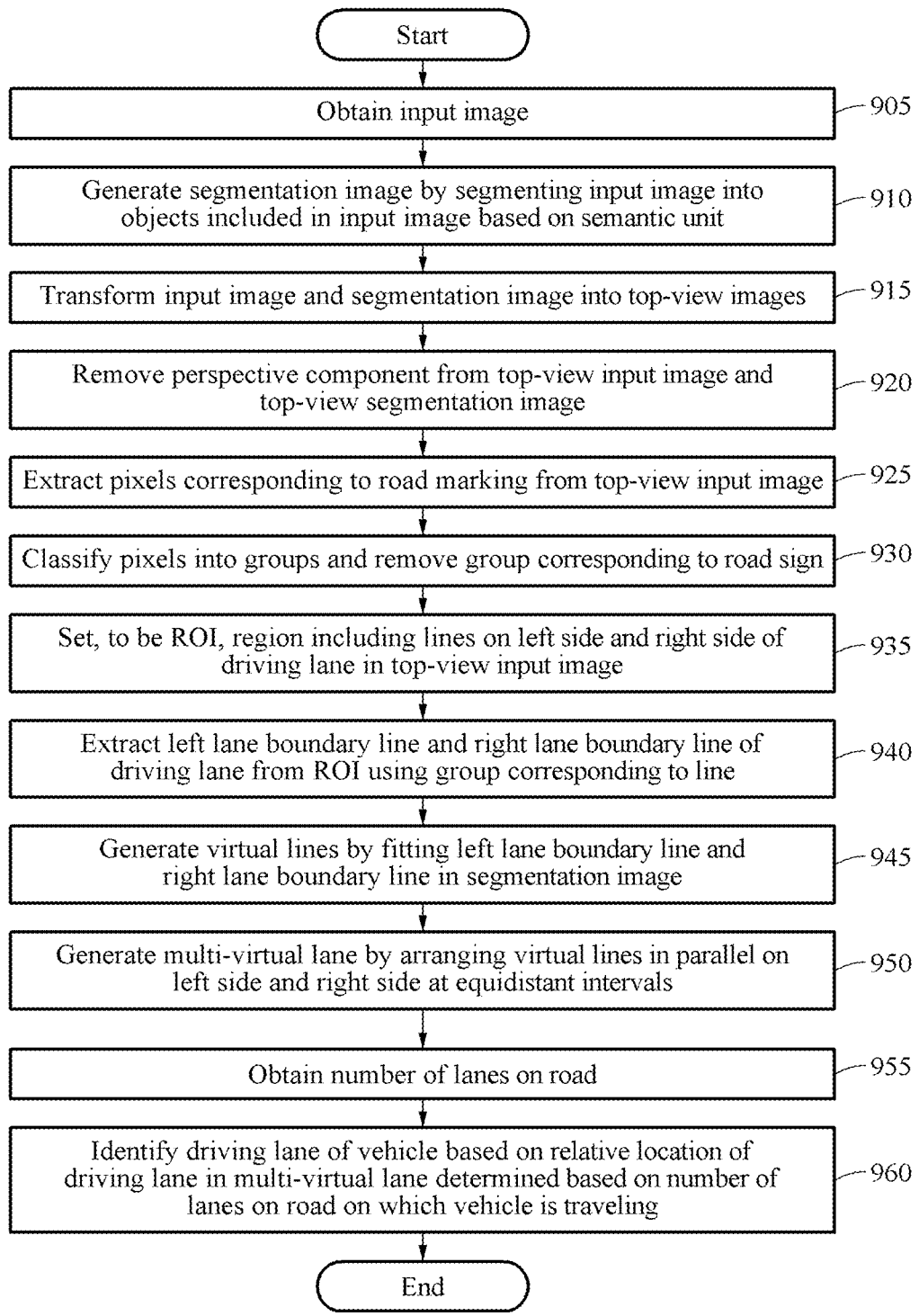
FIG. 9 is a diagram illustrating an example of a method of identifying a driving lane.

FIG. 9 is a diagram illustrating still another example of a driving lane identifying method. The driving lane identifying method may be performed by transforming an input image into a top-view image. The operations in FIG. 9 may be performed in the sequence and manner as shown, although the order of some operations may be changed or some of the operations omitted without departing from the spirit and scope of the illustrative examples described. Many of the operations shown in FIG. 9 may be performed in parallel or concurrently. One or more blocks of FIG. 9, and combinations of the blocks, can be implemented by special purpose hardware-based computer that perform the specified functions, or combinations of special purpose hardware and computer instructions. In addition to the description of FIG. 9 below, the descriptions of FIGS. 1-8B are also applicable to FIG. 9, and are incorporated herein by reference. Thus, the above description may not be repeated here.

In operation 905, the driving lane identifying apparatus obtains an input image. In operation 910, the driving lane identifying apparatus generates a segmentation image by segmenting the input image into objects included in the input image based on a semantic unit.

In operation 915, the driving lane identifying apparatus transforms the input image and the segmentation image into respective top-view images. In operation 920, the driving lane identifying apparatus removes perspective components from a top-view input image obtained through the transforming and a top-view segmentation image obtained through transforming.

In operation 925, the driving lane identifying apparatus extracts pixels corresponding to a road marking from the top-view input image. In operation 930, the driving lane identifying apparatus classifies the pixels into groups, and removes a group corresponding to a road sign of the road marking.

In operation 935, the driving lane identifying apparatus sets, to be a region of interest (ROI), a region including a left line and a right line of a driving lane of a vehicle in the top-view input image. In another example, the driving lane identifying apparatus sets an ROI based on the vehicle, and extracts a left line and a right line of the ROI.

In operation 940, the driving lane identifying apparatus extracts, from the ROI, a left lane boundary line and a right lane boundary line of the driving lane using a group corresponding to a line of the road marking.

In operation 945, the driving lane identifying apparatus generates virtual lines by fitting the left lane boundary line and the right lane boundary line in the segmentation image. In operation 950, the driving lane identifying apparatus generates a multi-virtual lane by arranging the virtual lines in parallel on a left side and a right side of the lane boundary lines at equidistant intervals.

In operation 955, the driving lane identifying apparatus obtains a number of lanes on a road on which the vehicle is traveling. In operation 960, the driving lane identifying apparatus identifies the driving lane of the vehicle based on a relative location in the multi-virtual lane determined based on the number of the lanes on the road. In operation 960, the driving lane identifying apparatus identifies the driving lane of the vehicle based on a relative location of the driving vehicle in the multi-virtual lane that is determined based on the number of the lanes on the road and a number of lanes of the multi-virtual lane.

Figure 10:
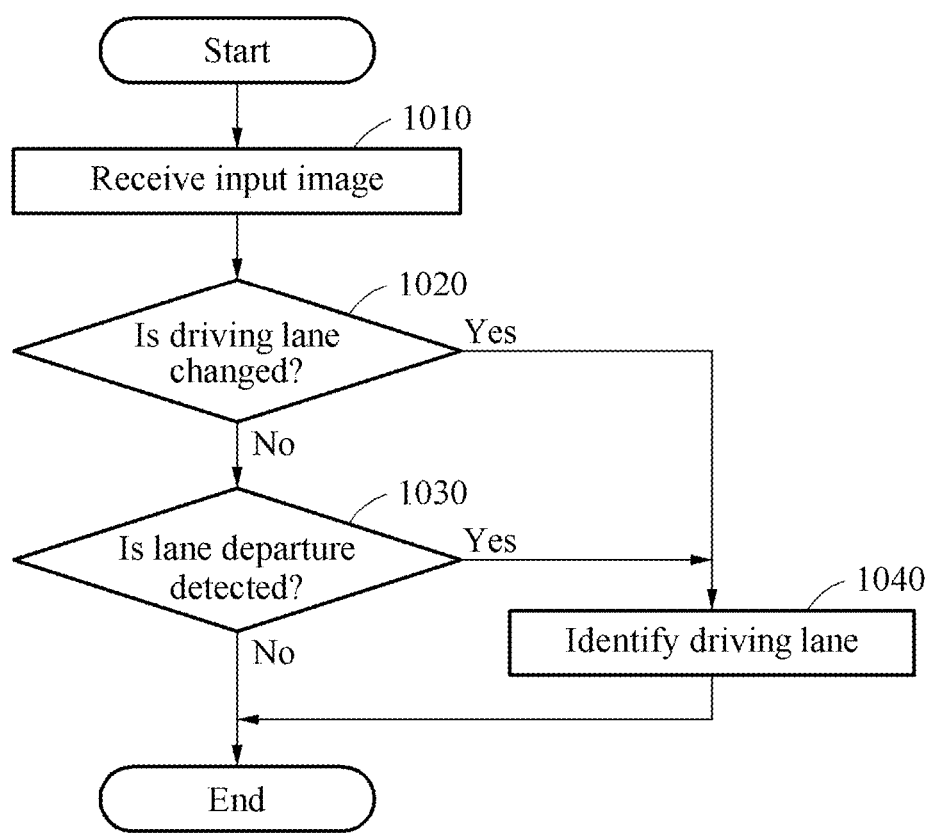
FIG. 10 is a diagram illustrating an example of a method of identifying a driving lane based on a driving environment in which the method is performed.

FIG. 10 is a diagram illustrating an example of a driving lane identifying method based on a driving environment in which the driving lane identifying method is performed. The operations in FIG. 10 may be performed in the sequence and manner as shown, although the order of some operations may be changed or some of the operations omitted without departing from the spirit and scope of the illustrative examples described. Many of the operations shown in FIG. 10 may be performed in parallel or concurrently. One or more blocks of FIG. 10, and combinations of the blocks, can be implemented by special purpose hardware-based computer that perform the specified functions, or combinations of special purpose hardware and computer instructions. In addition to the description of FIG. 10 below, the descriptions of FIGS. 1-9 are also applicable to FIG. 10, and are incorporated herein by reference. Thus, the above description may not be repeated here.

The driving lane identifying apparatus may receive an input image and recognize a change in a driving environment from the input image. Based on recognizing the change in the driving environment, driving lane identifying apparatus may perform the driving lane identifying method described herein. The change in the driving environment may include, for example, a change of a driving lane of a traveling vehicle, a departure of the vehicle from the driving lane, an entry of a nearby vehicle into the driving lane, a change in a lane configuration, and a change of a road marking. Some examples of the change in the lane configuration may be a decrease of two-way eight lanes to two-way six lanes, or a change of a lane to a bus-only lane. When the change in the driving environment is not recognized, the driving lane identifying apparatus may continue to maintain an initially identified lane. However, when the change in the driving environment is recognized, the driving lane identifying apparatus may perform operations of the driving lane identifying method described above.

Referring to FIG. 10, in operation 1010, the driving lane identifying apparatus receives an input image. In operation 1020, the driving lane identifying apparatus determines whether a change of a driving lane has occurred or not from the input image. The change of the driving lane may include, for example, a change in a lane configuration. For example, the driving lane identifying apparatus may determine whether the change of the driving lane occurs, for example, whether the driving lane changes from a second lane to a third lane, using map information as a reference. In operation 1040, in response to a determination that the driving lane changes, the driving lane identifying apparatus identifies the driving lane.

In operation 1030, in response to a determination that the driving lane does not change, the driving lane identifying apparatus determines whether a vehicle departs from the driving lane. For example, the driving lane identifying apparatus may detect a departure of the vehicle from the driving lane based on whether the vehicle departs from a left lane boundary line and a right lane boundary line of the driving lane by a certain distance.

In response to the departure from the driving lane not being determined in operation 1030, the driving lane identifying apparatus may terminate the operations described above. In operation 1040, in response to the departure from the driving lane being determined, the driving lane identifying apparatus identifies the driving lane.

Figure 11:
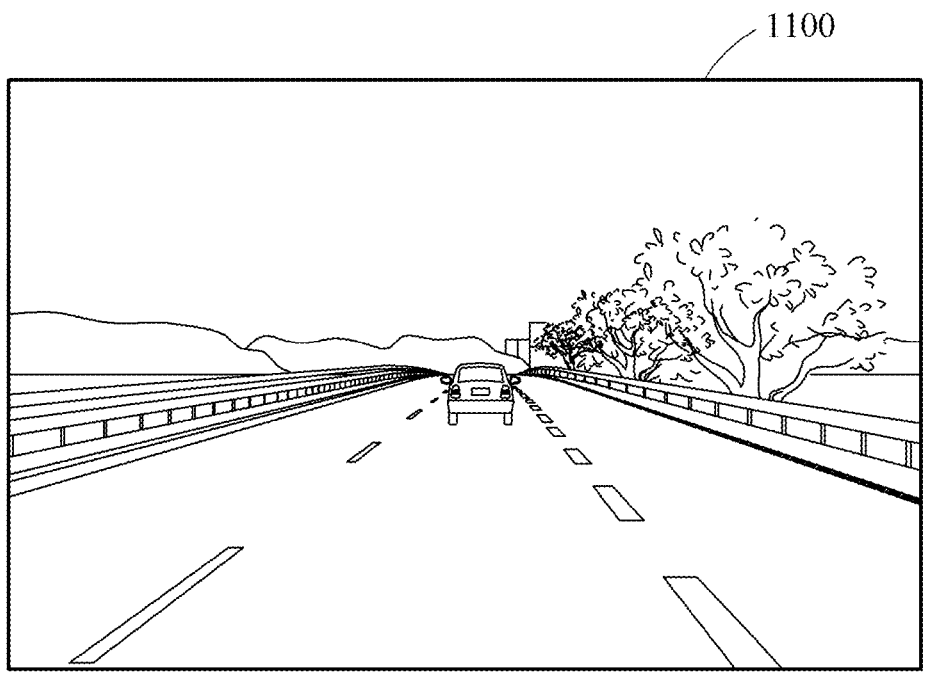
FIG. 11 is a diagram illustrating an example of an input image.

FIG. 11 is a diagram illustrating an example of an input image. Referring to FIG. 11, an input image 1100 is an image captured through an image sensor or a capturing device included in the driving lane identifying apparatus. An input image used herein may be a front-view image obtained by capturing an image in front of a vehicle traveling on a road and/or a side-view image obtained by capturing an image on side of the vehicle. The input image may include an entire road, or a road boundary portion of at least one of a left side or a right side of the road.

FIG. 12 is a diagram illustrating an example of a segmentation image. Referring to FIG. 12, a segmentation image 1200 includes objects classified or segmented by each class, for example, a road, a vehicle, a sidewalk, sky, and a roadside tree. The driving lane identifying apparatus may identify where and how components or elements are present in a segmentation image through labeling of a region for each class.

The driving lane identifying apparatus may segment an input image based on a semantic unit, determine a semantics of a segmented region by a pixel unit, and perform labeling for each class, for example, a road, a vehicle, a sidewalk, a human being, an animal, sky, and a building, to generate a segmentation image, for example, the segmentation image 1200 as illustrated.

In an example, the driving lane identifying apparatus may classify, into a class, a road marking including a line and a road sign that are marked on a road. In addition, the driving lane identifying apparatus may also classify a lane located close to a centerline, indicated by a dual solid, line into a driving lane class, and a lane located on another side of from the centerline into an opposite side lane class having a traveling direction opposite to that of a driving lane.

Figure 13:
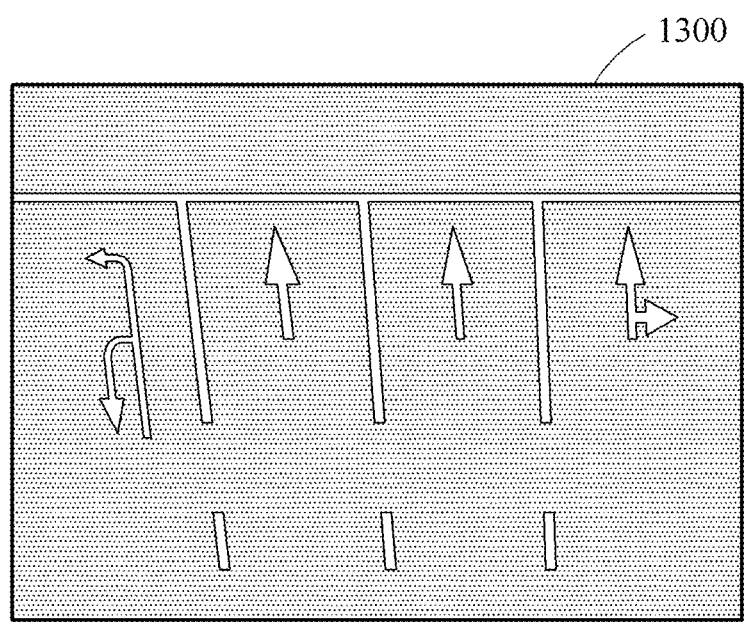
FIG. 13 is a diagram illustrating an example of a top-view image.

FIG. 13 is a diagram illustrating an example of a top-view image. FIG. 13 illustrates a top-view image 1300, which is a planar view of an input image or a segmentation image that is viewed from above.

The driving lane identifying apparatus may transform an input image or a segmentation image into the top-view image 1300 by applying an inverse perspective mapping (IPM) method to a detected line. When calibration information of a camera, for example, a height at which the camera is installed, an angle towards a ground, an angle towards a front side, and a projection matrix of the camera, is already known, the driving lane identifying apparatus may obtain a top-view image through homography mapping. However, when the calibration information of the camera is not obtained in advance, the driving lane identifying apparatus may discover points on two parallel lines in an input image, and obtain approximate calibration information using an actual distance and a pixel distance between the discovered points. Such values, for example, the actual distance between the points on the two parallel lines, may be obtained because lines are parallel to one another in a general road environment and a width between the lines follows a road regulation.

The driving lane identifying apparatus may obtain the top-view image 1300 by applying an inverse perspective transformation to an image of a road converging on a vanishing point, and thus, may determine a more uniform and clearer line. Thus, lines may be more distinguishable in the top-view image 1300.

The inverse perspective transformation may remove a perspective effect from an input image having the perspective effect, and convert location information of an image plane to location information of a world coordinate system. Through the inverse perspective transformation, the driving lane identifying apparatus may readily indicate a relative location of a vehicle on a road defined by a normal distance from a centerline of the road to an original point of the vehicle and a direction of the vehicle based on location information of a lane indicated in the world coordinate system.

For example, the driving lane identifying apparatus may obtain the top-view image 1300 by applying the inverse perspective transformation, based on a center of a bounding box included in a sliding window. Here, the driving lane identifying apparatus may apply the inverse perspective transformation only to a detected line, excluding surroundings, thereby considerably reducing an amount of computation, compared to transforming all pixels of an image. The top-view image 1300 may be a top-view segmentation image obtained through transforming.

FIG. 14 is a diagram illustrating an example of a road marking extracted from an input image. Referring to FIG. 14, the driving lane identifying apparatus extracts a road marking including lines 1410 and road signs 1430 from the top-view image 1300 using, for example, a pre-trained CNN, DNN, and SVM. The CNN used herein may be trained in advance to determine a line to be detected from an input image along with a bounding box of a road sign, and a line to be detected from an input image along with a type of a road sign.

FIG. 15 is a diagram illustrating an example of a method of generating virtual lines. FIG. 15 illustrates virtual lines 1510 and bounding boxes 1530 of road signs.

Referring to FIG. 15, the driving lane identifying apparatus removes the road signs from the top-view image 1300 using the bounding boxes 1530 of the road signs, and generates the virtual lines 1510 on a left side and a right side of a driving lane only using the lines 1410 extracted as illustrated in FIG. 14. The driving lane identifying apparatus fits the virtual lines 1510 on the left and right sides using spines or polylines, and represents the driving lane as a geometry of the virtual lines 1510.

FIGS. 16A and 16B are diagrams illustrating an example of a method of generating a multi-virtual lane. Referring to FIG. 16A, the driving lane identifying apparatus fits the geometry of the virtual lines 1510 illustrated in FIG. 15 in a top-view segmentation image 1610 obtained through top-view transformation.

The driving lane identifying apparatus generates virtual lines 1630 indicated by broken lines as illustrated in FIG. 16B by arranging the virtual lines 1510 indicated by solid lines to be in parallel on a left side and a right side at equidistant intervals in the segmentation image 1610. The driving lane identifying apparatus generates a multi-virtual lane divided by the virtual lines 1510 and 1630. The driving lane identifying apparatus determines whether the multi-virtual lane corresponds to a road component in the segmentation image 1610. The driving lane identifying apparatus determines a number of lanes of the multi-virtual lane based on a result of the determining.

As described, based on a number of lanes of a multi-virtual lane and/or a number of lanes on a road on which a vehicle is traveling, the driving lane identifying apparatus identifies a driving lane of the vehicle by determining which lane the driving lane corresponds to starting from a left or right boundary of the road.

FIGS. 17A and 17B are diagrams illustrating examples of road markings. FIGS. 17A and 17B illustrate various road markings including various lines and road signs.

A road marking may include a line, such as, for example, a centerline, and a bus-only lane demarcating line. In addition, the road marking may also include a sign or a symbol, such as, for example, a roadside demarcating line, a lane change restricting line, an obstacle indicating line, a no right turn sign, a no left turn sign, a no go straight sign, a no left and right turn sign, a no U-turn sign, a no parking sign, a no stop sign, a no parking and stop sign, a sign indicating a crosswalk ahead, a slow sign, a safety zone sign, a crosswalk, a raised crosswalk, a bicycle crossing road, a driving or traveling direction, a lane change, an uphill slope sign, and a traveling direction guide line.

In addition, the road marking may also include an arrow indicating, for example, straight, right turn, left turn, straight and right turn, straight and left turn, left and right turn, and U-turn, and also characters or texts indicating, for example, slowdown, speed limit, stop, children protection zone or school zone, protected/permitted left turn, and yield, and other driving or traveling guide wordings.

Figure 18:
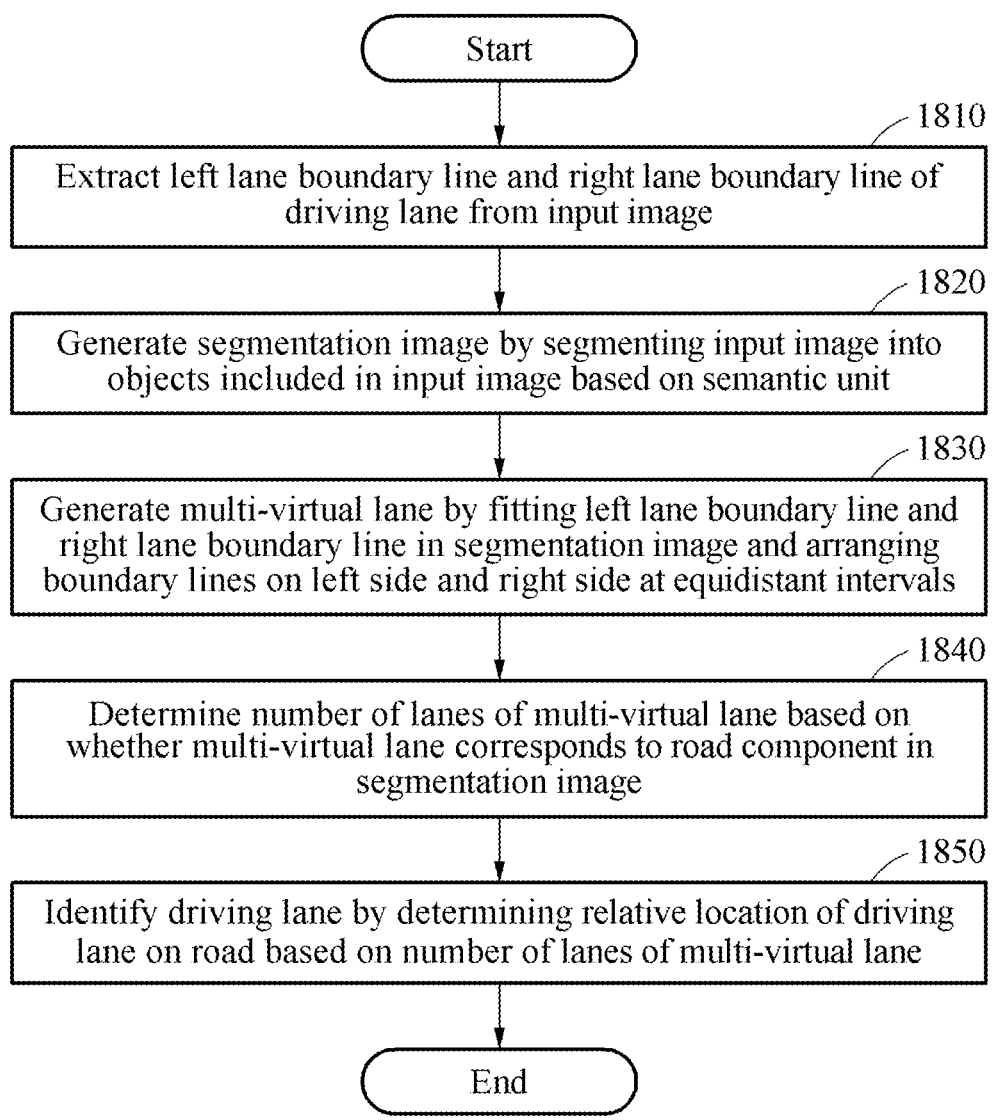
FIG. 18 is a diagram illustrating an example of a method of identifying a driving lane.

FIG. 18 is a diagram illustrating another example of a driving lane identifying method. The operations in FIG. 18 may be performed in the sequence and manner as shown, although the order of some operations may be changed or some of the operations omitted without departing from the spirit and scope of the illustrative examples described. Many of the operations shown in FIG. 18 may be performed in parallel or concurrently. One or more blocks of FIG. 18, and combinations of the blocks, can be implemented by special purpose hardware-based computer that perform the specified functions, or combinations of special purpose hardware and computer instructions. In addition to the description of FIG. 18 below, the descriptions of FIGS. 1-17B are also applicable to FIG. 18, and are incorporated herein by reference. Thus, the above description may not be repeated here.

Referring to FIG. 18, in operation 1810, the driving lane identifying apparatus extracts a left lane boundary line and a right lane boundary line of a driving lane from an input image. The input image may include at least one of a line or a road sign of a road marking.

In operation 1820, the driving lane identifying apparatus generates a segmentation image by segmenting the input image into objects include in the input image based on a semantic unit. In another example, the driving lane identifying apparatus transforms the input image to a top-view image, and extracts the left lane boundary line and the right lane boundary line of the driving lane from the top-view image. Here, the driving lane identifying apparatus may generate the segmentation image by segmenting the input image into the objects included in the input image based on a semantic unit, and transform the input image and the segmentation image to respective top-view images. In an example, the driving lane identifying apparatus removes a perspective component from the top-view input image obtained through the transforming and the top-view segmentation image obtained through the transforming.

In operation 1830, the driving lane identifying apparatus generates a multi-virtual lane by fitting the left lane boundary line and the right lane boundary line in the segmentation image and arranging the boundary lines on a left side and a right side at equidistant intervals. The driving lane identifying apparatus may set, to be an ROI, lines on a left and right side of the driving lane in a top-view input image obtained through the transforming. The driving lane identifying apparatus may extract, from the ROI, the left lane boundary line and the right lane boundary line using a group of pixels corresponding to a line. The driving lane identifying apparatus may generate virtual lines by fitting the left lane boundary line and the right lane boundary line in a top-view segmentation image obtained through the transforming. The driving lane identifying apparatus may generate the multi-virtual lane by arranging the virtual lines in parallel on a left side and a right side at equidistant intervals.

In operation 1840, the driving lane identifying apparatus determines a number of lanes of the multi-virtual lane based on whether the multi-virtual lane corresponds to a road component in the segmentation image. The driving lane identifying apparatus may match the multi-virtual lane to the segmentation image. The driving lane identifying apparatus may determine whether the multi-virtual lane corresponds to the road component in the segmentation image based on a result of the matching, and determine the number of the lanes of the multi-virtual lane based on a result of the determining.

In operation 1850, the driving lane identifying apparatus identifies the driving lane by determining a relative location of the driving lane on a road based on the number of the lanes of the multi-virtual lane. According to an example, the driving lane identifying apparatus may identify the driving lane by determining the relative location of the driving lane on the road using a number of lanes on the road on which a vehicle is traveling and the number of the lanes of the multi-virtual lane. For example, the driving lane identifying apparatus determines the relative location of the driving lane by determining which lane the driving lane corresponds to starting from one in a road boundary of the road, based on the number of the lanes on the road and the number of the lanes of the multi-virtual lane. Here, the number of the lanes on the road may be obtained from navigation information, road information, and/or a user input.

In addition, the driving lane identifying apparatus may recognize a change in a driving environment, and perform operations of the driving lane identifying method described above with reference to FIG. 18 based on a result of the recognizing.

Figure 19:
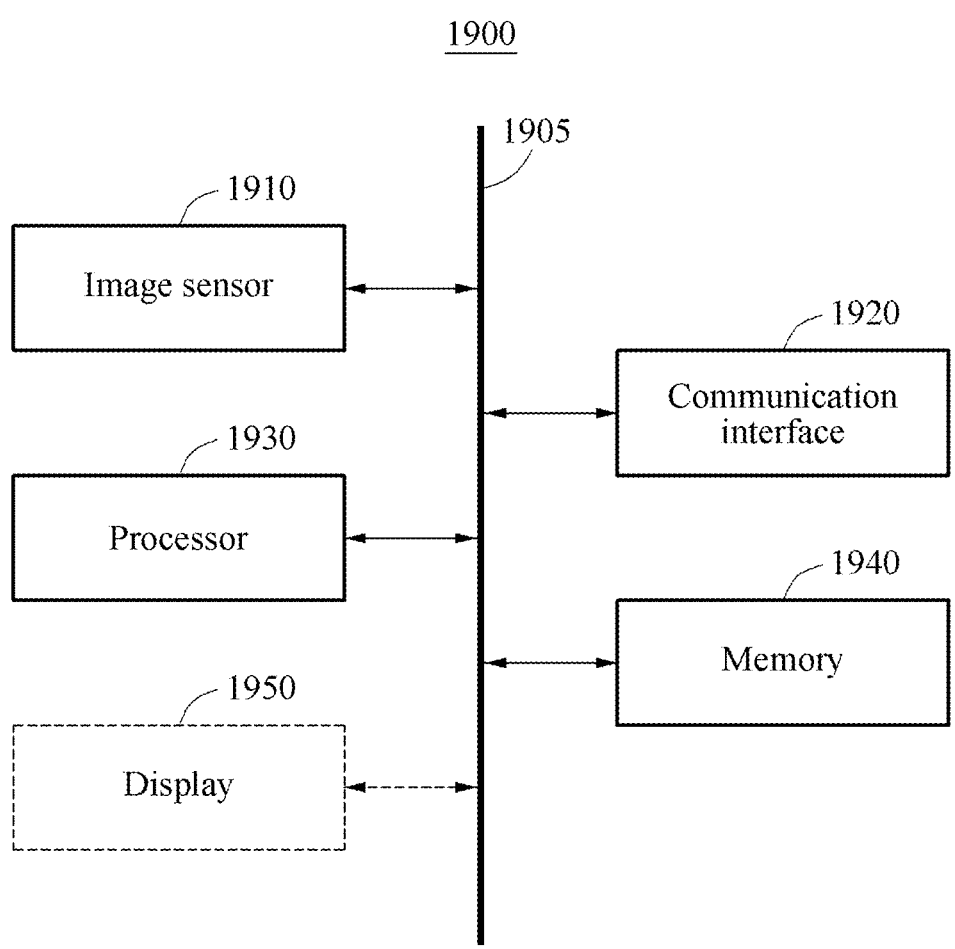
FIG. 19 is a diagram illustrating an apparatus for identifying a driving lane.

FIG. 19 is a diagram illustrating a driving lane identifying apparatus. Referring to FIG. 19, a driving lane identifying apparatus 1900 includes an image sensor 1910, a communication interface 1920, a processor 1930, and a memory 1940. According to an example, the driving lane identifying apparatus 1900 may further include a display 1950.

The image sensor 1910, the communication interface 1920, the processor 1930, the memory 1940, and the display 1950 may communicate with one another through a communication bus 1905.

The image sensor 1910 may detect or capture an input image.

The communication interface 1920 may receive map information and/or navigation information corresponding to a road on which a vehicle is traveling. According to an example, the communication interface 1920 may receive an input image captured outside the driving lane identifying apparatus 1900.

The processor 1930 may extract a road marking from the input image, and generate a multi-virtual lane using the extracted road marking and a segmentation image obtained by segmenting the input image into objects included in the input image based on a semantic unit. The processor 1930 may identify a driving lane along which the vehicle is traveling based on a relative location in the multi-virtual lane.

The processor 1930 may extract pixels corresponding to the road marking from the input image. The processor 1930 may classify the pixels into groups using a connected component operation, determine whether each of the groups of the pixels corresponds to a line or a road sign of the road marking, and remove a group corresponding to the road sign.

The processor 1930 may extract a left lane boundary line and a right lane boundary line of the driving lane using a group corresponding to the line. The processor 1930 may generate virtual lines by fitting the left lane boundary line and the right lane boundary line in the segmentation image, and generate a multi-virtual lane by arranging the generated virtual lanes in parallel on a left side and a right side at equidistant intervals in the segmentation image.

The processor 1930 may determine a number of lanes of the multi-virtual lane based on whether the multi-virtual lane corresponds to a road component in the segmentation image. The processor 1930 may identify the driving lane by determining a relative location on a road based on the number of the lanes of the multi-virtual lane. The processor 1930 may match the multi-virtual lane to the segmentation image, and determine whether the multi-virtual lane corresponds to the road component in the segmentation image based on a result of the matching. The processor 1930 may determine the number of the lanes based on a result of determining whether the multi-virtual lane corresponds to the road component.

According to an example, the processor 1930 may determine the relative location of the driving lane by counting a number of lanes on the road starting from one in a road boundary of the road and determining which of the lanes, does the driving lane corresponds to, based on the number of the lanes on the road and the number of the lanes of the multi-virtual lane. Here, the processor 1930 may obtain the number of the lanes on the road using the map information and the navigation information.

The processor 1930 may generate the segmentation image by segmenting the input image into the objects included in the input image based on a semantic unit. The processor 1930 may transform the input image and the segmentation image to respective top-view images, and remove a perspective component from a top-view input image obtained through the transforming and a top-view segmentation image obtained through the transforming.

The processor 1930 may extract pixels corresponding to the road marking of the road from the top-view input image obtained through the transforming, classify the pixels into groups, and remove a group corresponding to the road sign of the road marking.

The processor 1930 may set, to be an ROI, lines on a left and right side of a lane in the top-view input image. The processor 1930 may generate virtual lines by fitting, in the segmentation image, a left lane boundary line and a right lane boundary line of the lane that are extracted using a group corresponding to a line of the road marking in the ROI. The processor 1930 may then generate a multi-virtual lane by arranging the virtual lines in parallel at equidistant intervals.

The processor 1930 may recognize a change in a driving environment, and identify the driving lane of the vehicle by performing the driving lane identifying method described with reference to FIGS. 1 through 18. The change in the driving environment may include changes, such as, for example, at least one of a departure from the driving lane by the vehicle, an entry into the driving lane by a nearby vehicle, or a change of the road marking.

For example, when the vehicle needs to enter an expressway exit by crossing two lanes from a current driving lane, the processor 1930 may determine or predict whether or not to change the driving lane, and inform a user of a result of the determining or display the result of the determining through the display 1950, thereby enabling safe driving. In another example, the processor 1930 may determine or predict whether or not to change the driving lane, and inform a user of a result of the determining using an audio signal.

According to an example, in a case in which the processor 1930 determines that the vehicle needs to change the driving lane based on the identified driving lane and the driving environment, the processor 1930 may provide information for the changing of the driving lane, for example, a control parameter, as information for autonomous or automated driving of the vehicle.

In addition, the processor 1930 may perform the methods described with reference to FIGS. 1 through 18, or algorithms corresponding to the methods. The processor 1930 may execute a program and control the driving lane identifying apparatus 1900. A program code to be executed by the processor 1930 may be stored in the memory 1940.

The memory 1940 may store the input image, the segmentation image, the number of the lanes on the road, a relative location of the multi-virtual lane, and the map information and/or navigation information. The memory 1940 may also store the top-view input image and the top-view segmentation image that are obtained through transforming by the processor 1930.

The memory 1940 may also store parameters of a neural network trained in advance to recognize a road marking including a line and a road sign. The processor 1930 may then detect the road marking from the input image using the neural network to which the parameters stored in the memory 1940 are applied. The neural network used herein may be, for example, a CNN. The CNN may be trained such that a line to be detected from an input image is to be determined along with a bounding box of a road sign or with a type of a road sign.

In addition, the memory 1940 may store various pieces of information generated during the operations of the processor 1930 described above. The memory 1940 may also store various pieces of data and programs. The memory 1940 may include a volatile memory or a nonvolatile memory. The memory 1940 may include a mass storage medium such as a hard disk or the like to store various pieces of data. Further description of the memory is provided below.

In an example, the display 1950 is a physical structure that includes one or more hardware components that provide the ability to render a user interface and/or receive user input. The display 1950 may display, in the input image or a navigation image, the driving lane identified by the processor 1930. Also, in a case in which it is predicted that the driving lane needs to be changed, the display 1950 may indicate a direction in which the vehicle steers to change the driving lane based on the driving lane identified by the processor 1930. The display 1950 can encompass any combination of display region, gesture capture region, a touch sensitive display, and/or a configurable area. In an example, the display can be embedded in the driving lane identifying apparatus 1900. In an example, the display is an external peripheral device that may be attached to and detached from the driving lane identifying apparatus 1900. The display 1950 may be a single-screen or a multi-screen display. A single physical screen can include multiple displays that are managed as separate logical displays permitting different content to be displayed on separate displays although part of the same physical screen. The display 1950 may also be implemented as an eye glass display (EGD), which includes one-eyed glass or two-eyed glasses. In an example, the display 1950 is a head-up display (HUD) or a vehicular infotainment system.

The driving lane identifying apparatus 1900, and other apparatuses, units, modules, devices, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. The hardware components also access, manipulate, process, create, and store data in response to execution of the instructions or software. For simplicity, the singular term "processor" or "computer" may be used in the description of the examples described in this application, but in other examples multiple processors or computers may be used, or a processor or computer includes multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 and 18 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software includes at least one of an applet, a dynamic link library (DLL), middleware, firmware, a device driver, an application program storing the method of preventing the collision. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers While this disclosure includes specific examples, it will be apparent after gaining a thorough understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of identifying a driving lane, comprising:
   obtaining an input image;
   extracting a road marking from the input image;
   segmenting the input image into objects included in the input image based on a semantic unit to obtain a segmentation image;
   generating a multi-virtual lane using the road marking and the segmentation image;
   distinguishing a number of lanes of the generated multi-virtual lane based on the segmentation image; and identifying a driving lane of a vehicle as corresponding to one of the distinguished number of lanes based on a relative location of the driving lane in the multi-virtual lane.

2. The method of claim 1, wherein the input image is an image in front of the vehicle, and the image comprises a road on which the vehicle is traveling or a road boundary portion of at least a left side or a right side of the road.

3. The method of claim 1, wherein the road marking comprises any one or any combination of a line marked on a surface of a road, or a road sign comprising one or any combination of a sign and a character marked on the surface of the road.

4. The method of claim 3, wherein the extracting of the road marking comprises:
extracting pixels corresponding to the road marking from the input image; and
classifying the pixels into groups and removing a group corresponding to the road sign.

5. The method of claim 4, wherein the removing of the group corresponding to the road sign comprises:
classifying the pixels into groups using a connected component operation;
determining whether each of the groups of the pixels corresponds to the line or the road sign; and
removing the group corresponding to the road sign.

6. The method of claim 5, wherein the generating of the multi-virtual lane comprises:
extracting a left lane boundary line and a right lane boundary line of the driving lane using a group corresponding to the line;
generating virtual lines by fitting the left lane boundary line and the right lane boundary line in the segmentation image; and
generating the multi-virtual lane by positioning the virtual lines in parallel on a left side and a right side of the left lane boundary line and the right lane boundary line, respectively, at equidistant intervals in the segmentation image.

7. The method of claim 6, wherein the generating of the multi-virtual lane comprises:
generating the multi-virtual lane based on expanding a left lane boundary line and a right lane boundary line of the driving lane on a left side and a right side, respectively, at equidistant intervals in the segmentation image.

8. The method of claim 1, further comprising:
obtaining a number of lanes on a road on which the vehicle is traveling.

9. The method of claim 8, wherein the identifying of the driving lane comprises:
identifying the driving lane of the vehicle based on the relative location of the driving lane in the multi-virtual lane that is determined based on the number of the lanes on the road and a number of lanes of the multi-virtual lane.

10. The method of claim 9, wherein the number of the lanes on the road is obtained from map information.

11. The method of claim 1, further comprising:
transforming the input image into a top-view image.

12. The method of claim 11, wherein the transforming of the input image into the top-view image comprises:
transforming the input image and the segmentation image into a top-view input image and a top-view segmentation image, respectively; and
removing a perspective component from the top-view input image and the top-view segmentation image.

13. The method of claim 1, further comprising:
performing the obtaining, the extracting, the segmenting, the generating, and the identifying, in response to recognizing a change in a driving environment.

14. The method of claim 13, wherein the change in the driving environment comprises any one or any combination of a change of the driving lane by the vehicle, a departure of the vehicle from the driving lane, an entry of a nearby vehicle into the driving lane, and a change of the road marking.

15. A non-transitory computer-readable storage medium storing instructions that, when executed by a processor, configure the processor to perform the method of claim 1.

16. The method of claim 1, wherein the generating of the multi-virtual lane comprises:
generating the multi-virtual lane by expanding a left lane boundary line and a right lane boundary line of the driving lane to a left side and a right side, respectively, at equidistant intervals in the segmentation image.

17. The method of claim 1, wherein:
wherein the distinguishing of the number of lanes of the multi-virtual lane comprises distinguishing the number of lanes based on whether the multi-virtual lane corresponds to a road component in the segmentation image; and
the identifying of the driving lane comprises identifying the driving lane by determining a relative location of the driving lane on a road on which the vehicle is traveling based on the distinguished number of the lanes of the multi-virtual lane.

18. A method of identifying a driving lane, comprising:
obtaining an input image;
extracting a road marking from the input image;
segmenting the input image into objects included in the input image based on a semantic unit to obtain a segmentation image;
generating a multi-virtual lane using the road marking and the segmentation image; and
identifying a driving lane of a vehicle based on a relative location of the driving lane in the multi-virtual lane,
wherein the generating of the multi-virtual lane comprises:
generating the multi-virtual lane by expanding a left lane boundary line and a right lane boundary line of the driving lane to a left side and a right side, respectively, at equidistant intervals in the segmentation image.

19. A method of identifying a driving lane, comprising:
obtaining an input image;
extracting a road marking from the input image;
segmenting the input image into objects included in the input image based on a semantic unit to obtain a segmentation image;
generating a multi-virtual lane using the road marking and the segmentation image; and
identifying a driving lane of a vehicle based on a relative location of the driving lane in the multi-virtual lane,
wherein the identifying of the driving lane comprises:
determining a number of lanes of the multi-virtual lane based on whether the multi-virtual lane corresponds to a road component in the segmentation image; and
identifying the driving lane by determining a relative location of the driving lane on a road on which the vehicle is traveling based on the determined number of the lanes of the multi-virtual lane.

20. The method of claim 19, wherein the identifying of the driving lane comprises:
determining the relative location of the driving lane by counting a number of lanes on the road starting from a road boundary of the road and determining which of the lanes the driving lane corresponds to, based on the number of lanes of the multi-virtual lane.

21. A method of identifying a driving lane, comprising:
extracting, from an input image, a left lane boundary line and a right lane boundary line of a driving lane of a vehicle;
generating a segmentation image by segmenting the input image into objects included in the input image based on a semantic unit;
generating a multi-virtual lane by fitting, in the segmentation image, the left lane boundary line and the right lane boundary line on a left side and a right side at equidistance intervals;
determining a number of lanes of the multi-virtual lane based on whether the multi-virtual lane corresponds to a road component in the segmentation image; and
identifying the driving lane by determining a relative location of the driving lane on a road on which the vehicle is traveling based on the determined number of the lanes of the multi-virtual lane.

22. The method of claim 21, wherein the identifying of the driving lane comprises:
determining the relative location of the driving lane by counting a number of lanes on the road starting from a road boundary of the road and determining which of the lanes the driving lane corresponds to, based on the number of the lanes of the multi-virtual lane.

23. The method of claim 21, wherein the extracting of the left lane boundary line and the right lane boundary line of the driving lane comprises:
transforming the input image into a top-view image; and
extracting, from the top-view image, the left lane boundary line and the right lane boundary line of the driving lane.

24. The method of claim 23, wherein the transforming of the input image into the top-view image comprises:
transforming the input image and the segmentation image into a top-view input image and a top-view segmentation image, respectively; and
removing a perspective component from the top-view input image and the top-view segmentation image.

25. The method of claim 21, further comprising:
obtaining, from map information, a number of lanes on the road,
wherein the identifying of the driving lane comprises:
determining the relative location of the driving lane by counting the number of the lanes on the road starting from a road boundary of the road and determining the driving lane based on the number of the lanes on the road and the number of the lanes of the multi-virtual lane.

26. The method of claim 21, further comprising:
performing the extracting, the generating of the segmentation image, the generating of the multi-virtual lane, the determining, and the identifying, in response to recognizing a change in a driving environment.

27. An apparatus for identifying a driving lane, comprising:
an image sensor configured to capture an input image; and
a processor configured to:
extract a road marking from the input image,
obtain a segmentation image by segmenting the input image into objects included in the input image based on a semantic unit,
generate a multi-virtual lane using the road marking and the segmentation image,
distinguish a number of lanes of the generated multi-virtual lane based on the segmentation image, and
identify a driving lane of a vehicle as corresponding to one of the distinguished number of lanes based on a relative location in the multi-virtual lane.

28. The apparatus of claim 27, further comprising:
a memory configured to store any one or any combination of the input image, the segmentation image, a relative location of the multi-virtual lane, map information, and navigation information.

29. The apparatus of claim 27, wherein the processor is further configured to:
extract pixels corresponding to the road marking from the input image,
classify the pixels into groups using a connected component operation,
determine whether each of the groups of the pixels corresponds to a line or a road sign, and
remove the group corresponding to the road sign.

30. The apparatus of claim 27, wherein the processor is further configured to
for the distinguishing of the number of lanes of the multi-virtual lane, distinguish the number of lanes of the multi-virtual lane based on whether the multi-virtual lane corresponds to a road component in the segmentation image, and
identify the driving lane by determining a relative location of the driving lane on a road on which the vehicle is traveling based on the number of the lanes of the multi-virtual lane.

31. The apparatus of claim 27, wherein the processor is further configured to:
transform the input image and the segmentation image into respective a top-view input image and a top-view segmentation image, respectively, and
remove a perspective component from the top-view input image and the top-view segmentation image.

32. The apparatus of claim 27, further comprising:
a communication interface configured to receive any one or any combination of map information, navigation information corresponding to a road on which the vehicle is traveling and including a number of lanes on the road,
wherein the processor is further configured to identify the driving lane of the vehicle based on the relative location in the multi-virtual lane that is determined based on the number of the lanes on the road.

33. The apparatus of claim 27, wherein the processor is further configured to recognize a change in a driving environment, and
identify the driving lane, in response to the recognizing of the change in the driving environment.

34. A navigation apparatus comprising:
a sensor configured to capture an image in front of a vehicle; and
a processor configured to:
generate a segmentation image by segmenting the image into portions corresponding to objects included in the input image,
identify a left lane boundary line and a right lane boundary line from the image,
generate virtual lines based on fitting the left lane boundary line and the right lane boundary line in the segmentation image,
generate a multi-virtual lane based on arranging the virtual lines in parallel on at equidistant intervals in the segmentation image, determine a number of lanes of the multi-virtual lane based on whether the multi-virtual lane corresponds to a road object in the segmentation image, and identify a driving lane of the vehicle based on a relative location of the driving lane among the determined number of the lanes of the multi-virtual lane.

35. The navigation apparatus of claim 34, wherein the processor is further configured to:

extract pixels corresponding to a road marking from the image;

classify the extracted pixels into groups;

determine whether a classified group of the groups correspond to a line; and identify the left lane boundary line or the right lane boundary line, in response to the classified group corresponding to a line.

36. The navigation apparatus of claim 34, wherein the processor is further configured to:

transforming the input image and the segmentation image into a top-view input image and a top-view segmentation image, respectively; and extract information from the top-view input image and the top-view segmentation image to identify the left lane boundary line and the right lane boundary line.

37. The navigation apparatus of claim 36, wherein the processor is further configured to:

set a region of interest (ROI) on a left-side and a right-side of the vehicle in the top-view input image; and extract the left lane boundary line and the right lane boundary line from the ROI using objects corresponding to a line of a road marking.

38. The navigation apparatus of claim 34, wherein the processor is further configured to:

remove a portion of the segmentation image corresponding to opposite side lane object based on identifying a centerline of a road on which the vehicle is traveling.

39. The navigation apparatus of claim 34, wherein the processor is further configured to:

output the identified driving lane of the vehicle on a display.

40. A vehicle comprising:

a sensor configured to capture an image; and a driving lane identifying processor configured to:

extract a road marking from the image, obtain a segmentation image by segmenting the image into objects based on a semantic unit, generate a multi-virtual lane using the road marking and the segmentation image, and distinguish a number of lanes of the generated multi-virtual lane based on the segmentation image, and identify a driving lane as corresponding to one of the distinguished number of lanes based on a relative location of the vehicle in the multi-virtual lane.

* * * * *